(12) United States Patent
Mizutani et al.

(10) Patent No.: US 7,586,929 B2
(45) Date of Patent: Sep. 8, 2009

(54) METHOD AND SYSTEM FOR CONTENT-ORIENTED ROUTING IN A STORAGE-EMBEDDED NETWORK

(75) Inventors: Masahiko Mizutani, Kokubunji (JP); Hiroki Ikeda, Tachikawa (JP); Morihito Miyagi, Yokohama (JP); Shigeaki Kinoshita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 817 days.

(21) Appl. No.: 10/613,210

(22) Filed: Jul. 7, 2003

(65) Prior Publication Data
US 2004/0076154 A1   Apr. 22, 2004

(30) Foreign Application Priority Data
Oct. 17, 2002   (JP) .............................. 2002-302443

(51) Int. Cl.
*H04L 12/28* (2006.01)
*H04L 12/56* (2006.01)

(52) U.S. Cl. ....................... 370/422; 370/389
(58) Field of Classification Search ................ 370/389, 370/217, 218, 219, 422; 709/217, 218, 219, 709/247
See application file for complete search history.

(56) References Cited

U.S. PATENT DOCUMENTS

| 5,991,295 | A | 11/1999 | Tout et al. ................. 370/395.7 |
| 6,430,184 | B1 | 8/2002 | Robins et al. ............... 370/392 |
| 2002/0087730 | A1* | 7/2002 | Yonekura ..................... 709/247 |
| 2003/0028599 | A1* | 2/2003 | Kolsky ........................ 709/206 |
| 2008/0182559 | A1* | 7/2008 | Pyhalammi .............. 455/412.1 |

\* cited by examiner

*Primary Examiner*—Kevin C Harper
*Assistant Examiner*—Wanda Z Russell
(74) *Attorney, Agent, or Firm*—Brundidge & Stanger, P.C.

(57) ABSTRACT

A content relay node comprising a data processing unit for storing or transmitting a data packet on the basis of the data attribute, a storage connected to the data processing unit, transmitting units each for processing the header of a data packet in accordance with a control signal from the data processing unit and transferring the data packet to a neighboring relay node, and a routing control unit for selecting the transmitting unit or the data processing unit as a destination of a data packet on the basis of routing information including a storage address, wherein the storage unit stores a copy of a data packet at least until transfer of the data packet to the next node is completed.

15 Claims, 23 Drawing Sheets

CONTENT-ORIENTED ROUTING SESSION

STR: STORAGE CONTROL LAYER
AP: SESSION LAYER AND ABOVE
NW: NETWORK AND TRANSPORT LAYER
Link: DATA LINK AND PHYSICAL LAYER

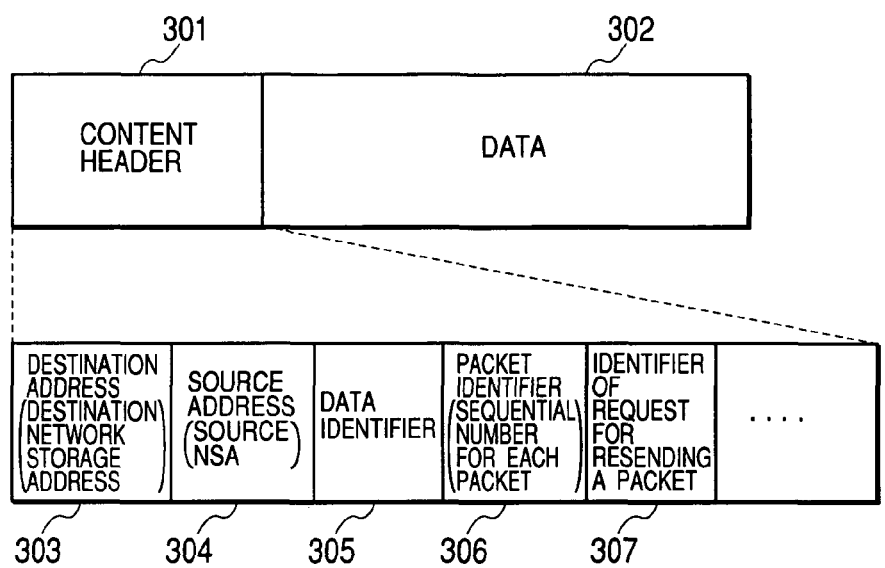

METHOD AND SYSTEM FOR CONTENT-ORIENTED ROUTING IN A STORAGE-EMBEDDED NETWORK

BACKGROUND OF THE INVENTION (1) Field of the Invention

The present invention relates to routing method and a relay node in a network. More particularly, the invention relates to a data transmission control and a relay node for routing a data packet by using information for data identification in an application layer of the data packet in order to efficiently transfer large data which is, for example, multimedia data such as video image and sound, and intra-enterprise technical data. In particular, the invention relates to data packet transmission control, packet routing with store-and-forward method, and a relay node using a storage address in a network constructed by storage units as components.

(2) Description of Related Art

In a conventional network system, routing technique according to a network layer protocol of the International Organization for Standardization/Open Systems Interconnection (ISO/OSI) reference model is used. Major protocols are the routing information protocol (RIP) of determining the most optimized route based on the number of routers existing on a route, the open shortest path first (OSPF) of determining a preferred route from a link state, and a border gateway protocol (BGP) of determining a preferred communication route between autonomous systems on the basis of properties of a link. According to the protocols, routers notify each other of routing information held in themselves, thereby propagating a network topology. By a calculating method determined for each protocol, on the basis of information such as address information defined in a network layer and the type of a communication line, a correspondence table (routing table) for indicating the relation between a destination of data and a destination interface is generated.

Each of data relay nodes (routers) forming a network generates, as a routing table, a table indicative of correspondence between a destination address and an output port on the basis of routing information learned from the other routers and connection information of itself and holds the table in a memory. Between the routers, routing information is periodically exchanged according to a routing protocol. The routing table is updated each time a link failure or a change in the network topology occurs.

On the routing table, one output port determined as the most appropriated output port is registered as an output port corresponding to one destination address. A data packet whose destination is determined by each router on the basis of the routing table is sent out to a relay node or terminal having the destination network address. An existing IP network is characterized in that only one route from a router to a destination is determined on the basis of a network address. In the case where traffic is heavy in a certain area, since a section of high load and a section which is not usually used are formed in the network, the network bandwidth cannot be effectively used as a whole.

A technique of performing high-speed secure transmission by adding a function to an IP network is being developed. Multi protocol label switching (MPLS) is a technique to which attention is paid most at present and being standardized in IETF and the like. The MPLS is a technique of realizing traffic control by performing a flow control using a label in transfer between routers. The MPLS is a means for establishing a path of connection type in a connectionless network and is highly effective from the viewpoint of security. In the MPLS, a route is set with reference to a routing table in the network layer, and a path is uniquely assured depending on the bandwidth usage by traffic engineering.

A protocol such as RSVP-TE or CR-LDP is standardized in IETF. A technique of setting a route capable of transferring data more efficiently depending on network usage on a reserved route when a route establishing request is sent from an MPLS network edge router on the user side to an edge router on the data transmission side is being studied. However, since a route and a label are determined in accordance with network conditions at the time point of the route setting, this technique does not adapt to a dynamic route control during data communication.

In a method called policy routing of setting an efficient route by centralizing the management of network usage, in response to information of congestion, a failure, or the like in a network bandwidth, each router can dynamically change the route on the basis of predetermined operation criteria or policy. In the routing selection, however, the number of available routes is limited. A network technique for distributing large data is as follows.

As data becomes larger and an enterprise information system expands, a system called a content distribution network (CDN) is in increasing demand. An object of the technique is to increase availability of data by improving a response to a request. Concretely, main subjects are to limit the number of accesses to each server, to improve performance, and to reduce the delay in the data transfer by adopting distributed data arrangement.

As a mainly used means for efficiently distributing data to an end user, a cache is disposed on an access network side. Particularly, in content providing service such as Web service, data frequently used by a number of users is stored in a cache server located at a position close to the users than an origin server, and data is distributed to the users from the cache server in place of the origin server. This configuration can reduce a traffic amount in a core network, make network resources effectively used, shorten the response time to the user, and improve the availability of service.

As the information service becomes diverse, it becomes indispensable to identify user information traffic and information service traffic. At present, a switch adapted to a high-order layer, for example, layer 7 switch for switching traffic according to the information in an application layer is widely used. This type of switches are employed to reduce the load of servers. For example, in a system including a plurality of servers corresponding to different services, by distributing traffic to the servers according to the contents of a user request or the state of load on the servers, individual performance of the servers can be improved.

In a network in which a plurality of servers having the same content are located in places apart from each other, means for selecting an optimum server on the basis of the network address of the user to which data is to be distributed, loads on the servers and response time, and sending a request to the selected server is also employed. The server load distributing technique is a control technique of a local traffic in a site, and it is different from a routing control based on a network address. At the present stage, attention is paid to the techniques of reducing traffic and a technique related to a network control at the time of data transfer does not exist.

Due to broadening of a bandwidth of access lines, dramatic increase in memory capacity of storages and, further, spread of mobile communication terminals in recent years, traffic of multimedia data such as a moving image and sound via a network increases and relocation of business data frequently occurs. When large data is used via a network as a network bandwidth is being widened, it is predicted that burst data traffic frequently occurs in places in a network. Traffic tends to increase in the form that streaming data or the like continuously flows in a network bandwidth for predetermined time.

According to a conventional routing in the network layer, since a route on a network is unconditionally determined in a routing table, there is a tendency that traffic is concentrated on a specific route and link source usage is unbalanced. Particularly, in the case where dense traffic occurs in a section on the network, there is the possibility that congestion or a link failure caused by the congestion occurs due to constraints of performances of a route search processing and packet switching processing.

Each router has to distribute large data with short delay and at low loss rate. However, for the above-described reasons, it is difficult for a conventional network system to sufficiently deal with an increase in traffic accompanying distribution of large data.

In a CDN as a technique adapted to distribution of large amount of content, response to a request is improved by adopting a distributed arrangement of servers and caches. However, since the network layer routing protocol is used at the time of data distribution, a problem similar to that of the routing control remains unsolved. To be specific, when dense traffic is concentrated, transfer efficiency deteriorates.

On the other hand, IP-VPN service of combining routing control by traffic engineering with the CDN is in increasing demand and an interest in bandwidth control is growing. In the traffic engineering, however, a function addressing a change in bandwidth usage after setting of a route is not prepared, so that a problem of concentration of processes on a specific line remains unsolved when traffic is dense. This is one of critical problems to be solved in future in a network in which streaming data and real-time communication become the main stream instead of download data. A network node in future needs the function capable of efficiently using a bandwidth in order to distribute large data.

SUMMARY OF THE INVENTION

In view of the above points, an object of the invention is to provide a method and system for content-oriented routing in a storage-embedded network realizing reduced packet loss and reduced delay in transmission at the time of distributing a large amount of data, and improved distribution efficiency of an entire network by reducing congestion in the network, and capable of easily adding or deleting a router to and from an existing network and easily improving performance of a network.

Another object of the invention is to provide flexible routing control means adapted to QoS control according to an attribute of content and use state of a network in cooperation with a conventional network technique, and to improve data distributing efficiency.

A content relay node having a function of routing a data packet in an application layer according to the invention comprises: a receiving unit having a plurality of input ports; a transmitting unit having a plurality of output ports; a data processing unit; a switch unit for connecting the receiving unit, the transmitting unit, and the data processing unit; a plurality of storage shaving a data storing function; and a routing control unit for controlling the receiving unit, the transmitting unit, the switch unit, and the storages, wherein each of the data packets includes a storage address for identifying the plurality of storages on a network and a data attribute, the receiving unit has means for receiving a data packet, means for extracting the storage address and the data attribute from the data packet, means for transferring the data attribute to the routing control unit, and means for sending the data packet to the switch, the routing control unit has means for selecting, as a destination of a received data packet, one of the transmitting unit and the data processing unit on the basis of routing information including the storage address and instructing the switch unit to make switching, the storage has means for storing the received data, the switch unit has means for switching a route on the basis of the control signal, the data processing unit has means for storing or transmitting data on the basis of the data attribute, and the transmitting unit has means for processing the header of a data packet in accordance with a control signal from the control unit and means for transferring the data packet to a neighboring relay node.

BRIEF DESCRIPTION OF THE DRAWINGS

FIG. 12 is a diagram showing the configuration of a data header of a re-transmission request packet to be sent to a content relay node as a packet source, in response to a data re-transmission request in the content-oriented routing according to the invention.

FIG. 13 shows an example of definition of a storage address in the invention.

DETAILED DESCRIPTION OF PREFERRED EMBODIMENTS

Embodiments of the invention will be described in detail.

Figure 1:
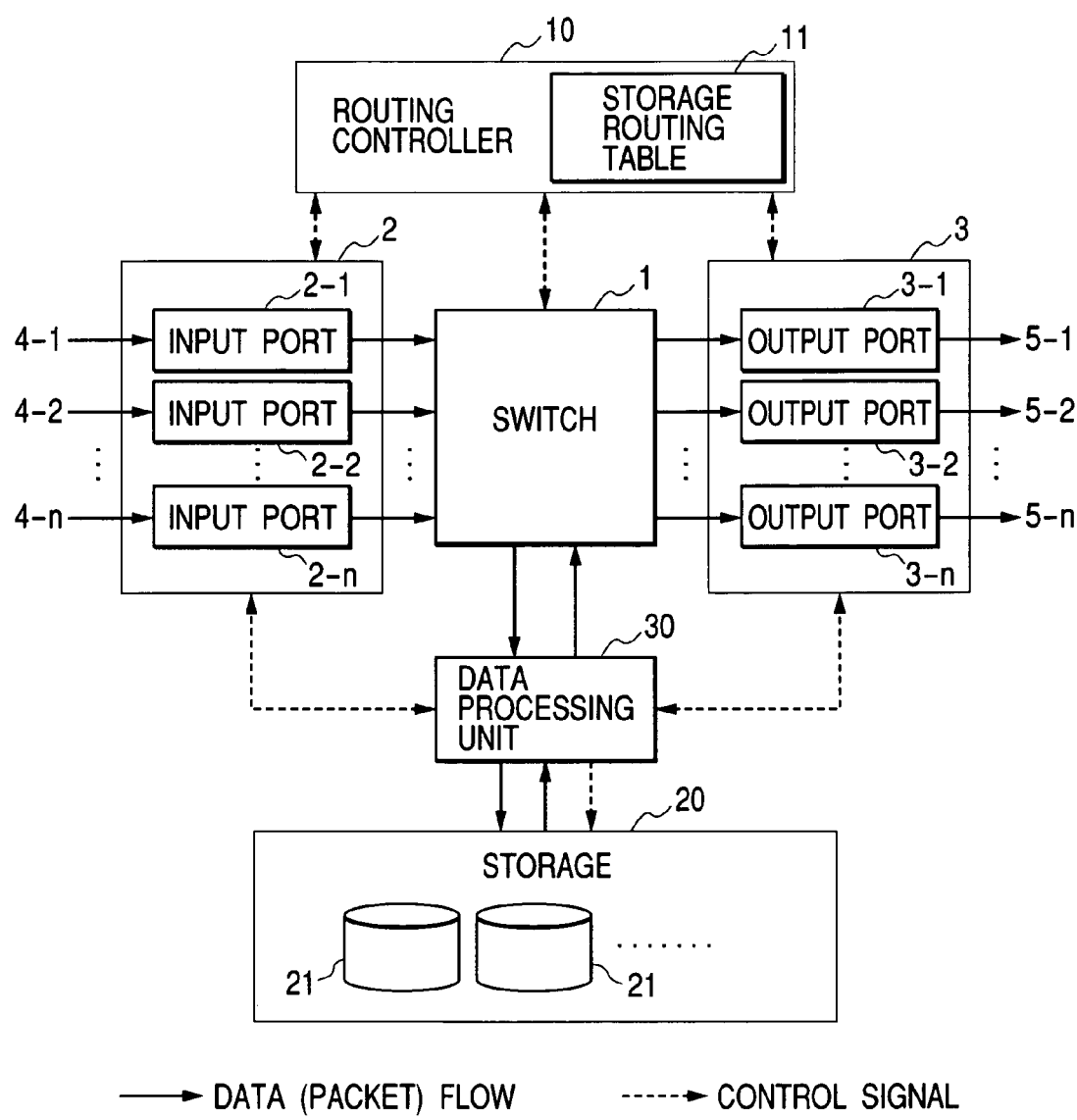
FIG. 1 is a block diagram showing a basic configuration of a content relay node to which the invention is applied.

FIG. 1 is a block diagram showing a basic configuration of an apparatus to which the invention is applied. It is assumed that a content relay node in the invention is used for a network in which heavy data traffic frequently occurs and an access network whose bandwidth is being broadened in recent years.

In order to connect with other network nodes and perform routing control, the content relay node has a data receiving unit 2 including a plurality of input ports (logical ports) 2-1 to 2-$n$ connected to a plurality of lines 4-1 to 4-$n$, respectively, and a data transmitting unit 3 having a plurality of output ports 3-1 to 3-$n$ connected to a plurality of lines 5-1 to 5-$n$, respectively. The content relay node has a software switch 1 for connecting the input and output ports in order to switch the path between incoming and outgoing routes in the node. Communication is performed with a program of a transport layer or below through the logical input and output ports 2-1 to 2-$n$ and 3-1 to 3-$n$ to transmit data.

The switch has the function of determining a combination of an input port and an output port necessary to transmit a data packet on the basis of a result of route search in a routing control unit and establishing a transfer route in the node. The switch also has the function of transmitting a copy of received data to a control unit (data processing unit 30) in order to temporarily store data at the time of relaying the data.

A routing control unit 10 has the function of performing a route search process of determining the destination of a data packet on the basis of data identification information of an application layer included in the data packet and the function of transmitting a control signal to the switch and the data transmitting unit on the basis of the result of the route search. The routing control unit 10 holds a storage routing table (SRT) 11 for routing.

The data processing unit 30 has the function of assembling and segmenting data at the time of data packet transmission/reception and temporarily storing received data. Data is read and written from and to a storage unit 20 via the data processing unit 30. Information necessary for the process of assembling and segmenting data is included in the header portion of a data packet. Header information is extracted or written by the data receiving unit 2 or data transmitting unit 3. The storage unit 20 connected to the data processing unit 30 is comprised of one or a plurality of storages 21 for storing data at the time of transferring large data or when a main memory becomes insufficient in the transfer process. The storage 21 may be a large capacity of memory, a hard disk, or a combination of a memory and a hard disk. The term "storage" is used as the general term for these constructions in the following description.

A signal processing in the node of the invention will now be described. A data packet supplied to the input ports 2-1 to 2-$n$ sequentially passes through the receiving unit 2, switch 1, and transmitting unit 3 and is transferred to the next relay node via the output ports 3-1 to 3-$n$. The receiving unit 2 extracts header information included in a received data packet and sends the header information as control information to the routing control unit 10.

The routing control unit 10 determines an output port in the transmitting unit 3 on the basis of the control information such as destination node IP address received from the receiving unit 2 by referring to the storage routing table SRT 11 and sends a control signal to the switch 1 and the transmitting unit 3.

By the control signal, the switch 1 determines correspondence between an input port and an output port and sends the data packet to the transmitting unit 3. The control information extracted by the receiving unit 2 includes the destination node IP address, source node IP address, and an identifier indicative of other data attributes of the packet. The transmitting unit 3 transmits the data packet to the next relay node on the basis of the control information received from the routing control unit 10 after adding, as necessary, the header information to the data packet.

The configuration shown in FIG. 1 is realized mainly by software and is described only by processes in the layer upper than a transport layer in the ISO/OSI reference model. Routing is determined in an upper layer. Transfer is executed by communicating with the lower layer protocol through the receiving and transmitting units.

The configuration of the content relay node of FIG. 1 can be also designed by applying physical interfaces for the receiving and transmitting units and applying, for example, an N×N crossbar switch for the switch 1. In this case, the receiving unit, switch, and transmitting unit relating to data transfer have configurations common to those of a conventional router architecture using a network layer address. In the receiving and transmitting units, a circuit for performing high-speed hardware process or the like is installed in order to perform a packet process exclusively. Determination of a route in the application layer using the SRT and the physical address in a data link layer or below are controlled in a direct linkage manner with the Network Storage Address (NSA).

Figure 2:
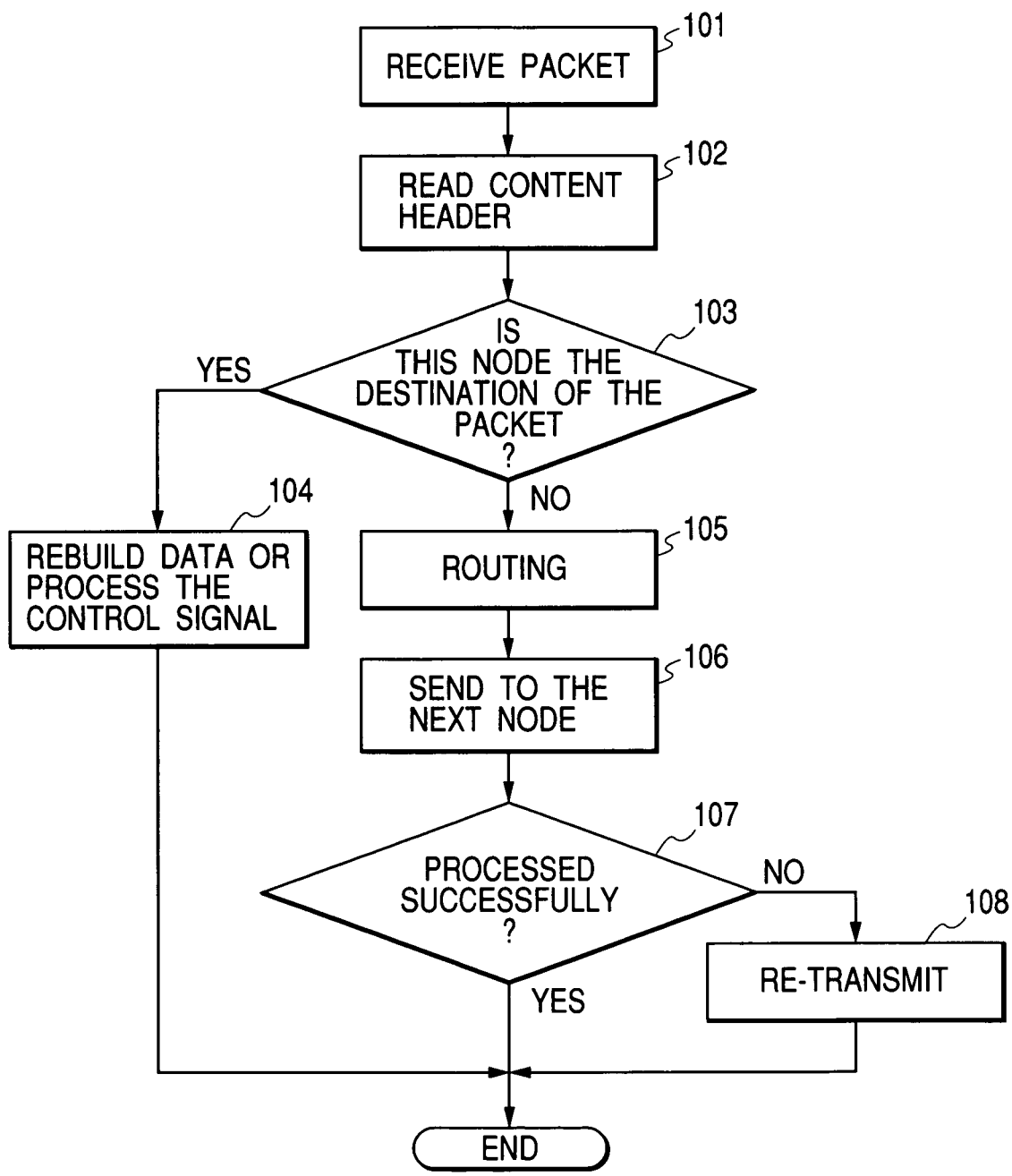
FIG. 2 is a flowchart of data transferring process, which relates to content-oriented routing according to the invention.

FIG. 2 shows a flowchart of the content routing process according to the invention.

A data packet is supplied from the communication lines 4-1 to 4-n to the receiving unit 2 via the input ports 2-1 to 2-n. In step 101, the receiving unit 2 receives a packet. In step 102, control information (hereinbelow, called a content header) such as destination information written in the head portion of an area storing application layer data on a packet is read out. In step 103, whether the destination information included in the header matches the address of the node or not is determined. If YES, in step 104, on the basis of the information of the header portion including the data header, data operating process of storing data inside the node or execution of the data is performed in accordance with the kind of received data after assembling data sent in the form of a plurality of packets as necessary.

If it is determined in step 103 that the received packet is a data packet whose destination is not the node but which is to be sent to the other destination via the node, in step 105, the NSA of the next content relay node corresponding to the destination address is determined by referring to the SRT 11 held in the routing control unit 10, and a combination of the input port of the packet and the output port obtained by the SRT 11 is sent to the switch 1. By the control signal, connection between the input and output ports of the switch adapted to packet transfer is established, and the data is sent to the transmitting unit.

In step 106, the data header is added by the transmitting unit 3 in accordance with the packet transmitting route determined in the routing control unit 10, and the resultant data is sent out to the next relay node. After the transmission, whether the data transfer has succeeded or not is determined in step 107. When it is determined that part or all of the data has failed to be sent due to some problem occurred between the node and the next relay node, a process of re-transmitting the data stored in the node is performed in step 108. When it is determined that the data transfer has been completed normally, the routing process is finished.

Figure 3:
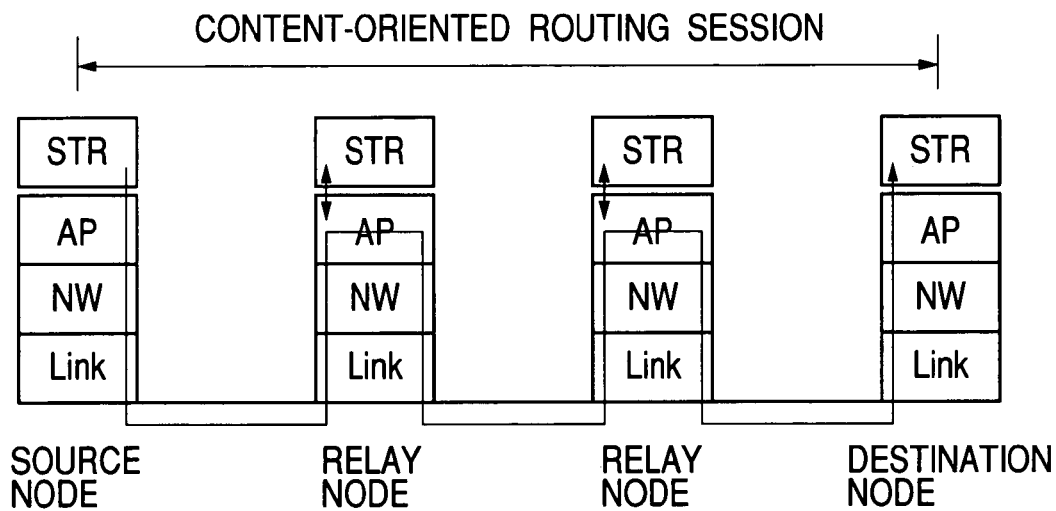
FIG. 3 is a block diagram showing the configuration of a communication protocol related to the content-oriented routing according to the invention.

FIG. 3 is a conceptual diagram showing the relation between protocols related to the content routing of the invention.

A network connecting content relay nodes is formed in layers of the storage address. As to the form of a network of autonomous transfer between neighboring nodes, in the embodiment, it is considered that a session between a source and a destination is established to transfer data more reliably by grasping a transfer state.

By using a high-reliably transfer protocol such as a transport layer protocol (TCP or the like) for transfer from the storage unit 20 of the node to a storage unit in the next relay node, data transfer between the relay nodes can be assured. Alternately, as shown in the embodiment of the invention, each of the content relay nodes may be provided with means for checking perfection of data at the time of storing the data into the storage unit. It is assumed that the neighboring relay nodes have a function of providing assurance of the perfection of data. Therefore, each time data transmission in an area is finished, the network bandwidth between nodes is released.

Figure 4:
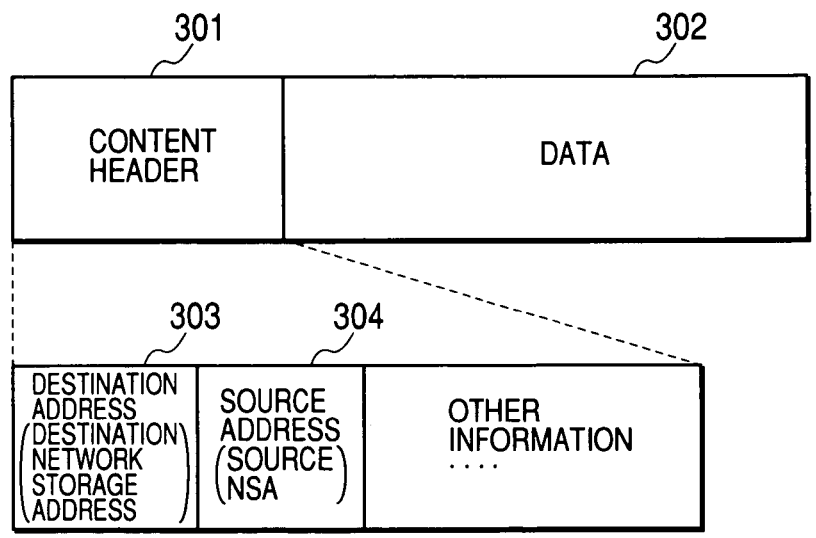
FIG. 4 is a diagram showing a basic configuration of a header to be attached to each of data blocks divided at the time of transfer, which relates to the content-oriented routing according to the invention.

FIG. 4 shows basic elements of a data header used in the content routing of the invention.

A data packet comprises a content header 301 and data 302. The content header 301 includes a destination Network Storage Address (NSA) 303 of the content relay node as a final destination at least in the storage network and a source NSA 304 as a source address. The content header 301 is used for processes such as a destination address search, data segmentation at the time of divided data transmission, and data reproduction at the time of divided data reception.

Figures 5, 6:
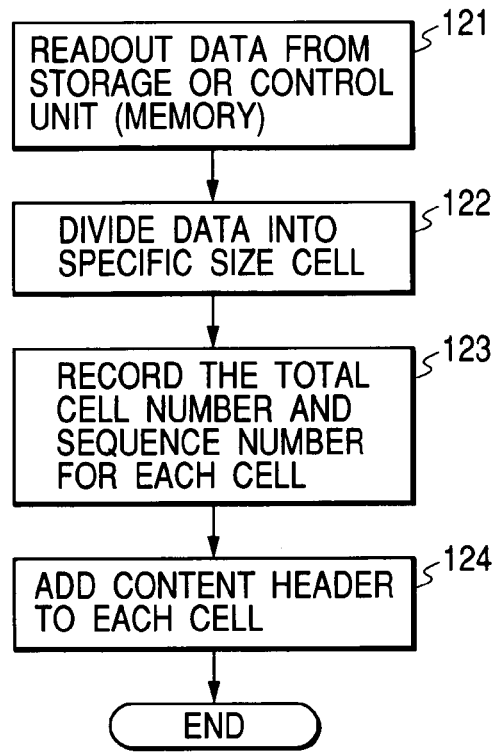
FIG. 5 is a flowchart of process of data segmentation and data packet creation in the content-oriented routing according to the invention.
FIG. 6 is a diagram showing basic components of a routing table related to routing control in the content-oriented routing according to the invention.

FIG. 5 shows a data segmentation process in the content routing according to the invention.

The data read out from the storage unit 20 in step 121 is divided into a plurality of cells having a size proper to data transmission in step 122. A necessary header is added to each of the data cells in steps 123 and 124 and the resultant cell are sent out. Each time data passes through a content relay node, the data reproducing, data segmentation or data transfer is carried out by the data processing unit 30 in the node. On completion of the series of processing from data reception to data transmission in each relay node, the memory space is released.

FIG. 6 shows a basic configuration of the storage routing table (SRT) used in the content routing of the invention.

The SRT is stored in a memory of the routing control unit 10 and is used to retrieve an address 403 in the table corresponding to the destination address 303 of a packet sent from the receiving unit 2 to the routing control unit 10 and to determine an appropriate destination address 404. The destination address obtained from the SRT is associated with the input port number of the packet and is used for controlling the switch 1.

The SRT includes at least a final destination address 401 on the route through which data is transferred according to the routing method of the invention and a storage address 402 of the next relay node through which the packet passes on the route to the destination. Further, as reference information, auxiliary information such as the capacity of available memory space in a relay node existing on the route and lapse time since updating of the route may be also included.

In the routing method according to the invention, a route capable of utilizing the memory space in each node most effectively is selected on the basis of the capacity of the available memory space of a relay node. According to the method, a route can be determined independently of a routing table in the IP layer. Although the table is periodically updated here so as to be adapted to network topology and a use state of the memory space in a relay node, the table may be updated as necessary.

Figure 7:
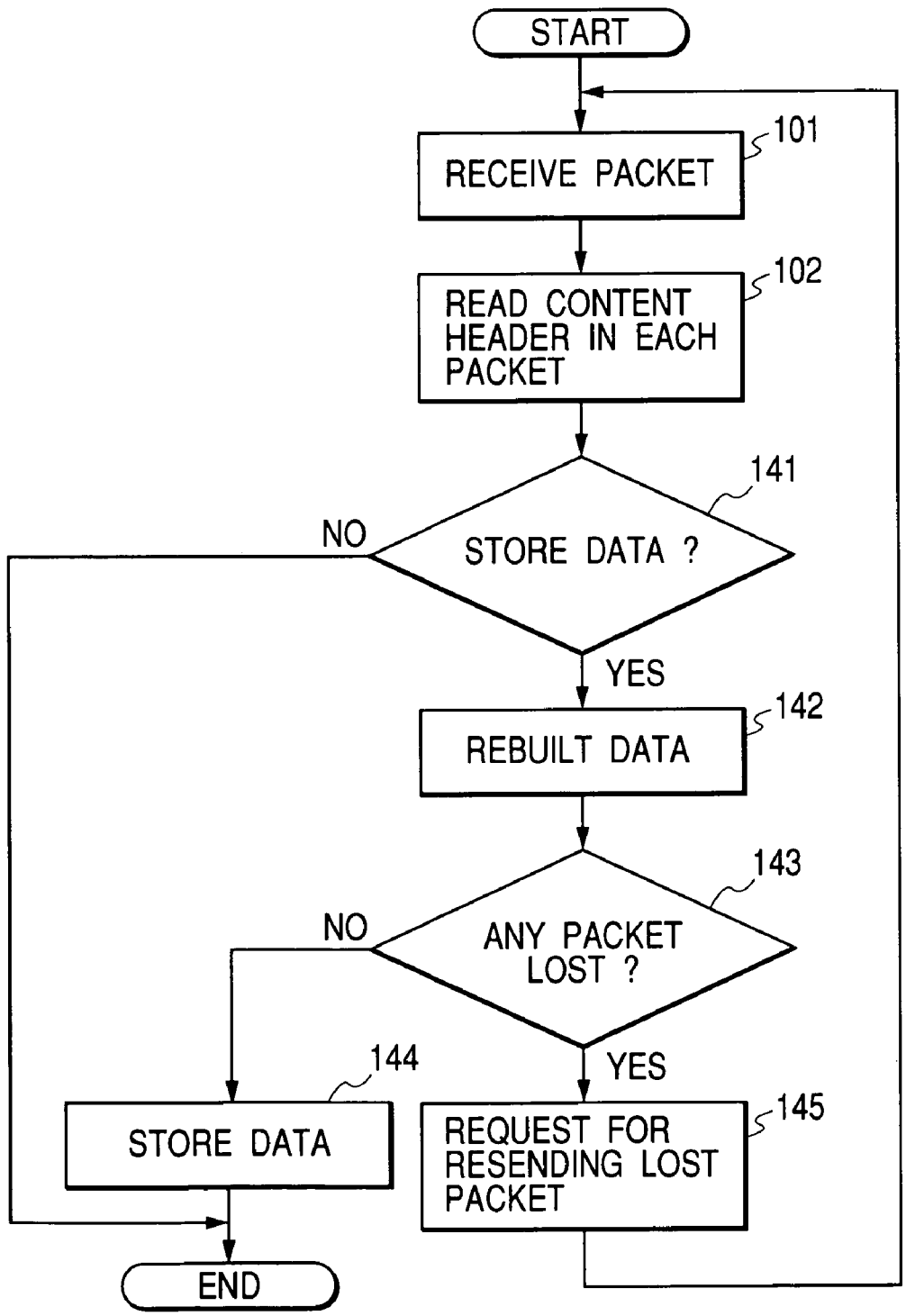
FIG. 7 is a flowchart showing the flow of general process of reproduction and storage of received data which relates to the content-oriented routing according to the invention.

FIG. 7 shows the flow of process of storing received data into a storage area in the relay node.

The destination and attribute information of a data packet supplied to the receiving unit 2 according to the flowchart of FIG. 2 is checked by a content header processing in step 102. Whether the data is to be stored or not is determined in step 141 on the basis of external factors such as the available space in the storage of the relay node in the information network and individual header information such as attributes of relayed data. If it is determined that the data needn't be stored, only the routing processing is performed.

In the case of storing data, the data is rebuilt in step 142 according to information for data reproduction such as the content identifier included in the content header and the packet sequential number assigned when the data is transmitted in a divided data form. When it is determined that a part of the data is not received yet in step 143 of confirming data transfer, a re-transmission request is sent to the relay node at the immediately preceding stage or in the closest position in step 145, and then, lost data is obtained. When the rebuilt data is stored in the routing control unit 10 or storage unit 20 in step 144, the series of processing is finished.

Figure 8:
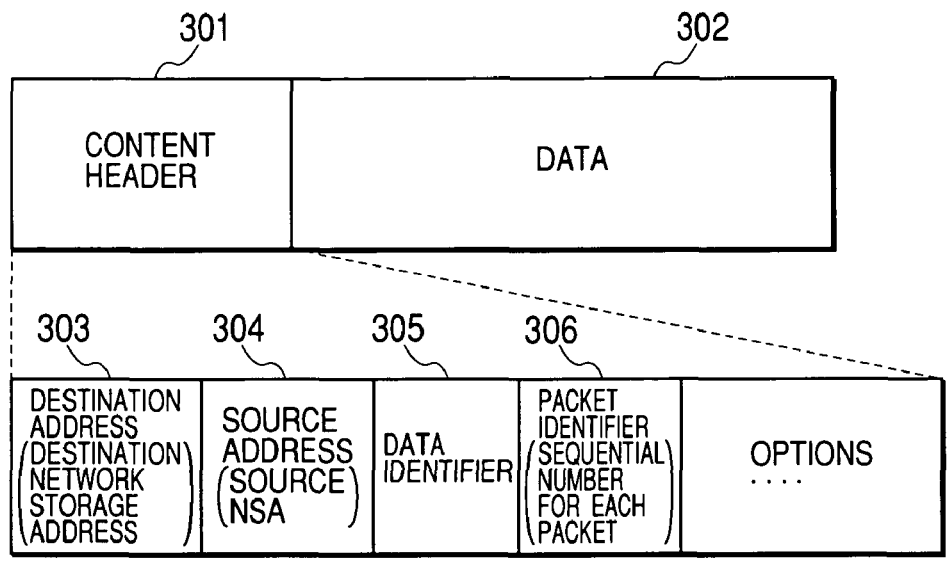
FIG. 8 is a diagram showing basic configuration of a data header used for received data storing process in accordance with the invention.

FIG. 8 shows header information of a data packet related to data reproducing and storing process.

The header includes, in addition to the address information 303 and 304 used at the time of content routing, a data identifier 305 and an identifier 306 such as a sequential number assigned at the time of data segmentation. In this case, the sequential number 306 is associated with the data identifier 305.

Figure 9:
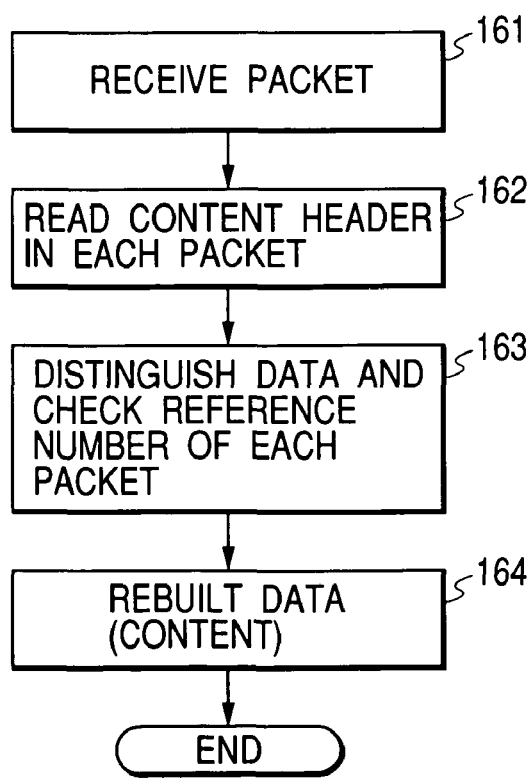
FIG. 9 is a flowchart of process of reproducing data from a data packet in accordance with the invention.

The process performed at the time of data reproduction in step 142 in FIG. 7 is shown in FIG. 9. Data is distinguished by the data identifier 305 and packets having the same identifier are arranged in the correct order according to the packet sequential numbers 306 in step 163. In step 164, the data is rebuilt.

Figure 10:
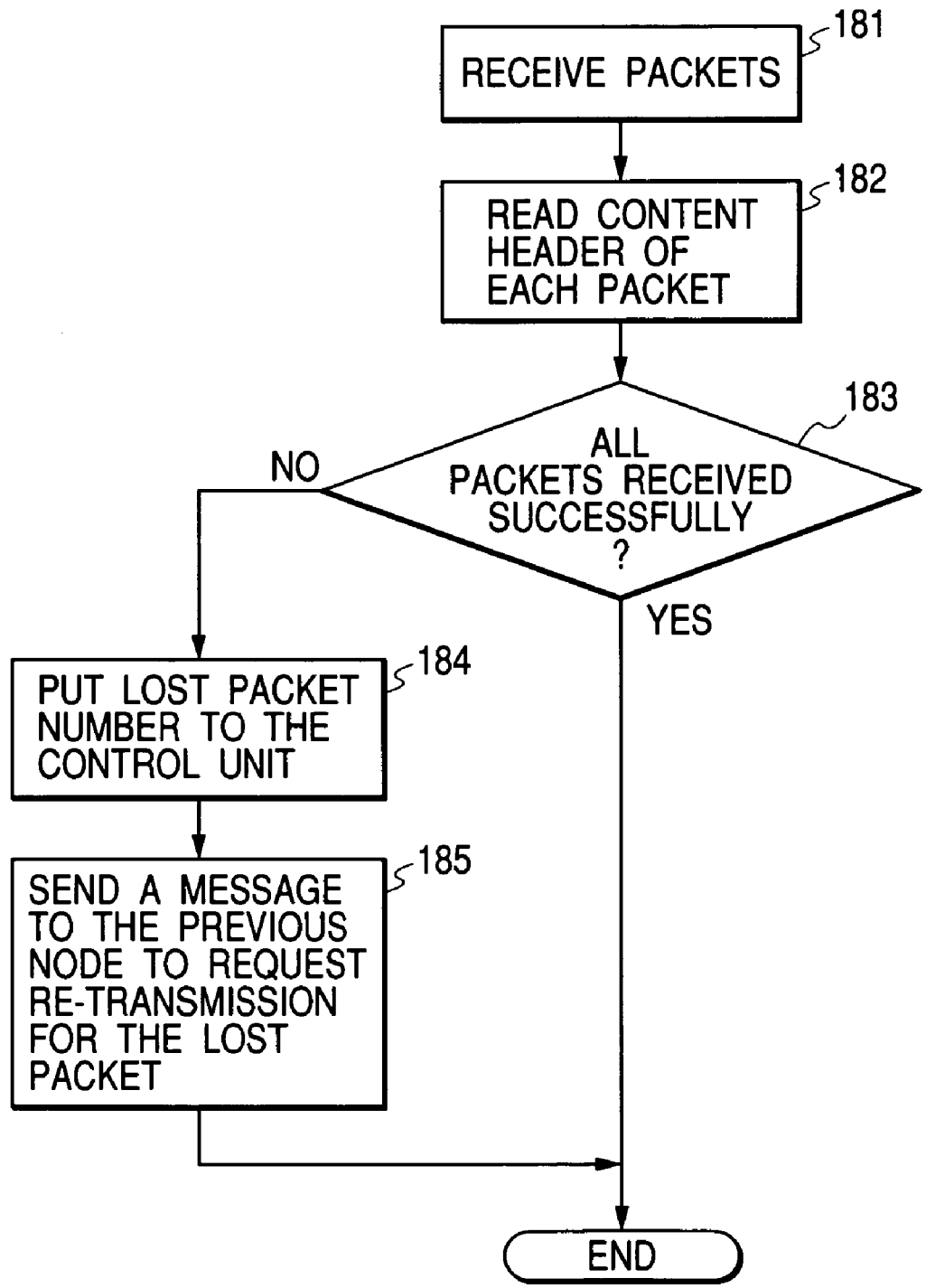
FIG. 10 is a flowchart of process of checking perfection of data and process of sending a re-transmission request in the content-oriented routing of the invention.

FIG. 10 shows a data packet checking process performed at the time of data reproduction.

On the basis of the sequential number 306 used as re-building information at the time of data reproduction, whether necessary packets have been received with reliability or not is determined in step 183. When a data packet is not received or an incomplete packet is received, a re-transmission request is sent to the immediately preceding relay node in step 185.

Figure 11:
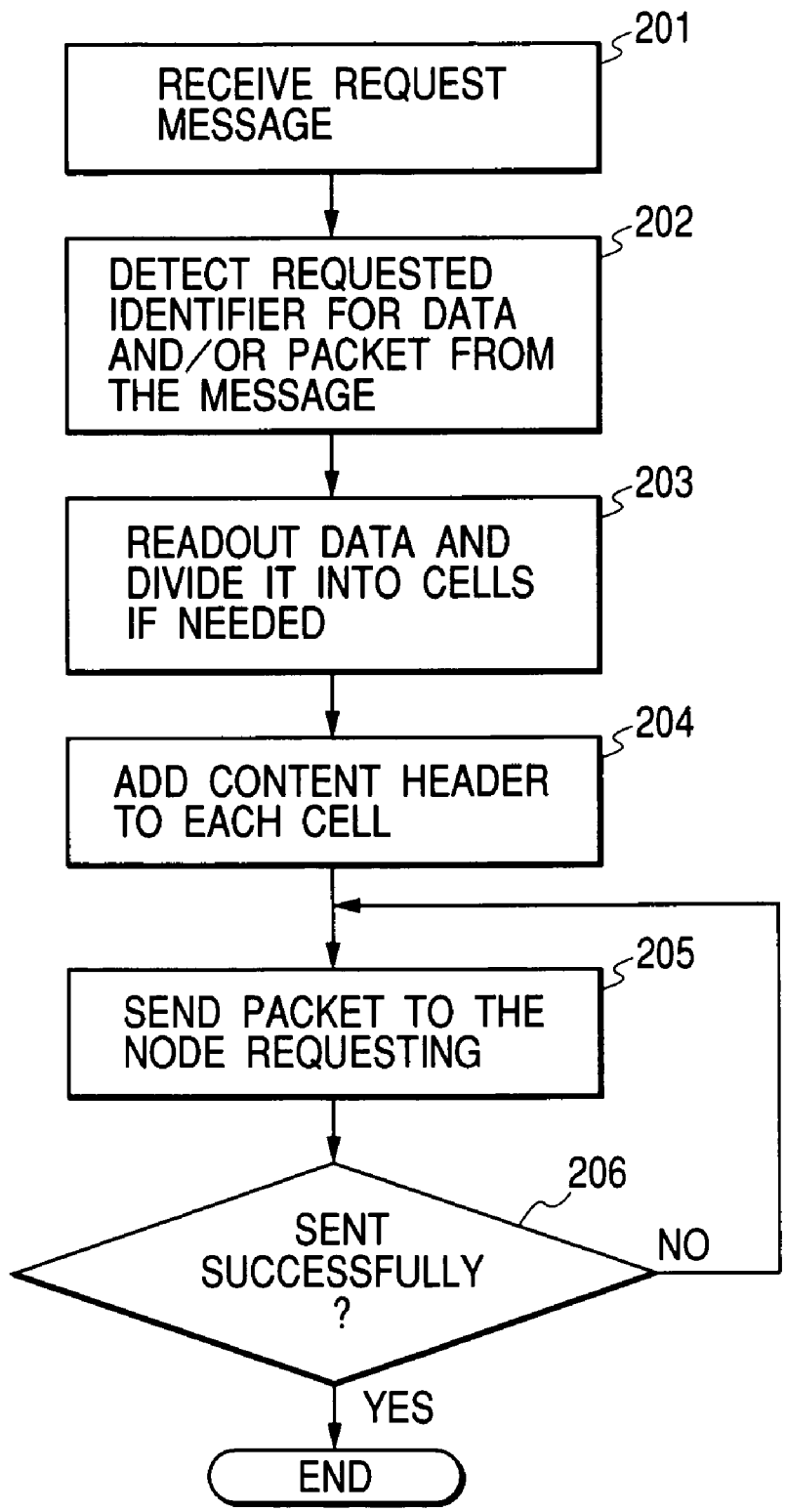
FIG. 11 is a flowchart showing the flow of process of transmitting data stored in a content relay node in accordance with the invention.

FIG. 11 shows the flow of process performed in the case where the relay node receives the data re-transmission request from the destination.

When the transmission request message is received in step 201, in a manner similar to normal routing, content header processing, for example, detection of the requested identifier for data and/or packet from the received message is performed in step 202. Subsequently, in step 203, on the basis of the information such as the requested data and the requested sequential number, the necessary data is read out from the memory or storage and divided into cells in order to generate data packets. The cells are subjected to a content header processing of adding a content header to each cell in step 204. In step 205, the resultant packet is sent out to the next relay node. When completion of transmission is determined in step 206 of judging whether the transmission has succeeded or not, the data transmitting process is finished.

FIG. 12 shows the structure of the header of a packet indicative of a transmission request.

The header includes an identifier 305 for identifying requested data, the sequential number 306 of the required data, and an identifier of the request 307 indicating that the packet is of a re-sending request.

FIG. 13 shows an example of definition of the NSA as an embodiment of the invention.

The network storage address NSA is used not only as identification information of a storage such as an HDD which can be physically distinguished but also includes definition of an area which is logically partitioned and definition using a directory designation indicative of a storage location of data. Therefore, the correspondence between an interface (port) and the NSA can be changed variously according to the definition of the NSA, thereby to configure a flexible network.

Figure 14:
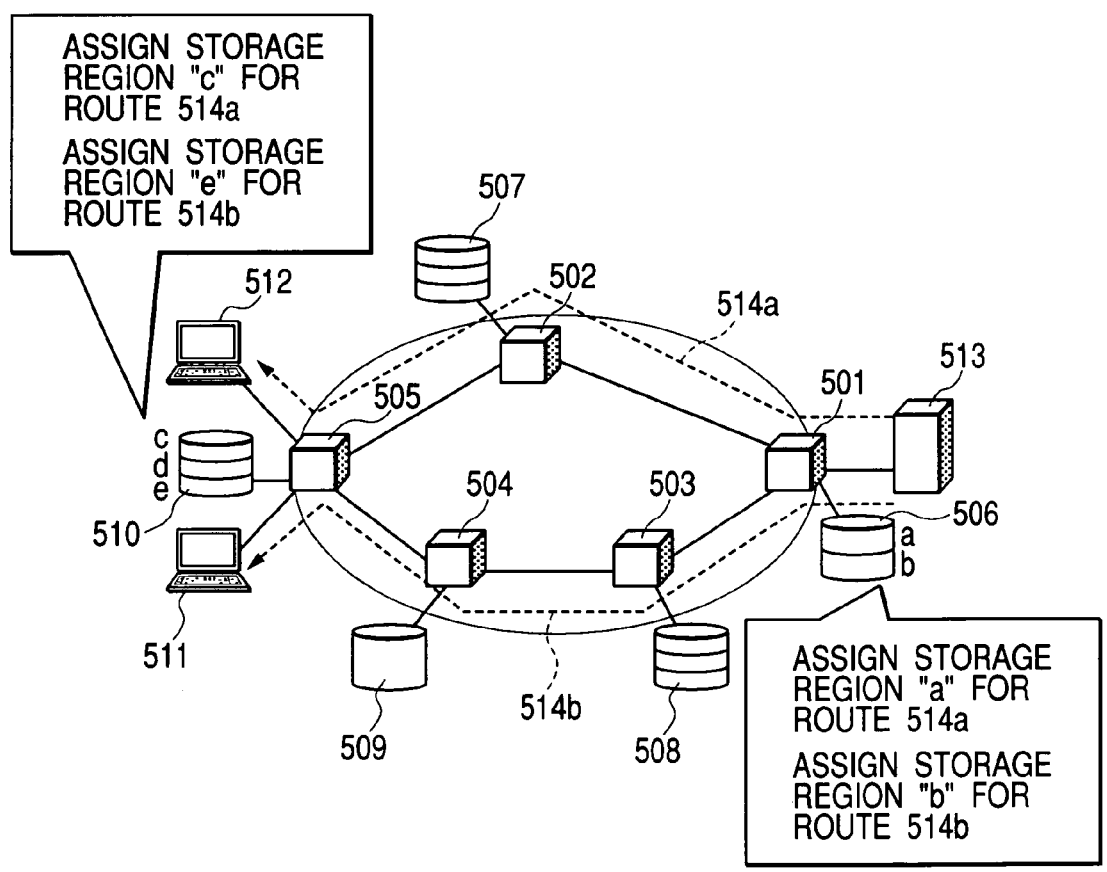
FIG. 14 is a conceptual diagram of a network configuration using a storage address in the invention.

FIG. 14 is a conceptual diagram for explaining an example of the network configuration in the case where each relay node has a plurality of NSAs.

The content routing network is expressed by using NSAs of the relay nodes. Consequently, when a certain relay node has a plurality of NSAs, for example, a plurality of data flows can be simultaneously relayed by selecting as necessary an NSA by which an area for data relay can be assured. FIG. 14 is shown on assumption that data is distributed from a server 513 to users 511 and 512 via an edge node 505. A relay node 501 has two NSAs and uses an area having a NSA "a" for a data flow 514a. The edge node 505 uses an area having a NSA "c" for a data flow 524b. When a data flow 514b is generated before the completion of the flow 514a, the relay node 501 uses an are a having NSA "b", thereby assuring a data transfer area for the data flow 514b. The edge node 505 uses, for example, an area having NSA "e" to establish a route to the user.

The content relay node according to the invention has the content routing function and also the function of storing data into a storage. By transferring information while storing it, as compared with the conventional transfer method according to the network layer protocol, data can be distributed more reliably.

Figure 15:
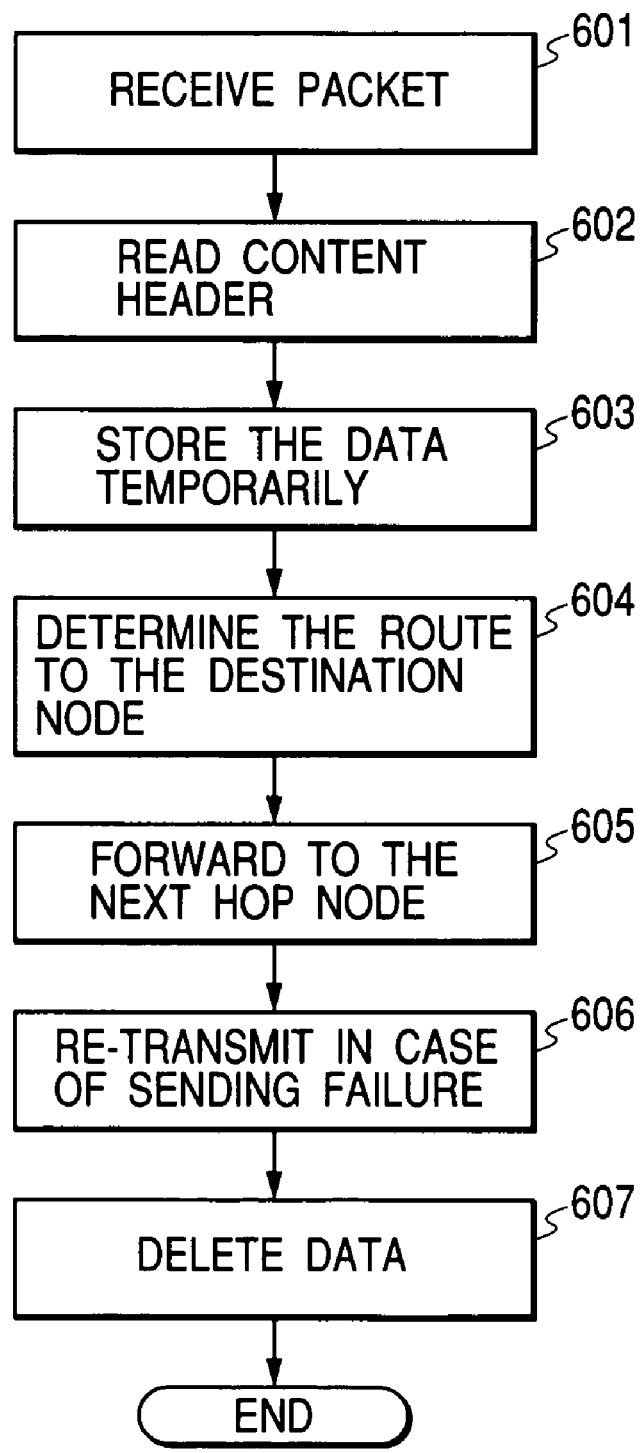
FIG. 15 is a flowchart showing received data processing and routing performed in a data processing unit which relates to the content-oriented routing according to the invention.

FIG. 15 shows a flowchart of process of routing received data after storing the data into the data control unit. This corresponds to a process performed in the case where received data has a small size or belongs to a data flow which does not have to be stored into a storage.

The receiving unit 2 performs processing on the content header 301 such as detection of a destination and extraction of data packet identification information. After that, processing of temporarily storing data on the basis of the header information is performed, and the reproduced data is stored into the data processing unit 30 in step 603. In the following steps 604 to 607, the routing process is performed according to the flowchart shown in FIG. 2 and the stored data in the data processing unit 30 is deleted when completion of transmission is confirmed. In a re-transmission step 606, a data packet or re-built data stored in the data processing unit is read out and transmitted after performing data segmentation and header addition as necessary.

Figure 16:
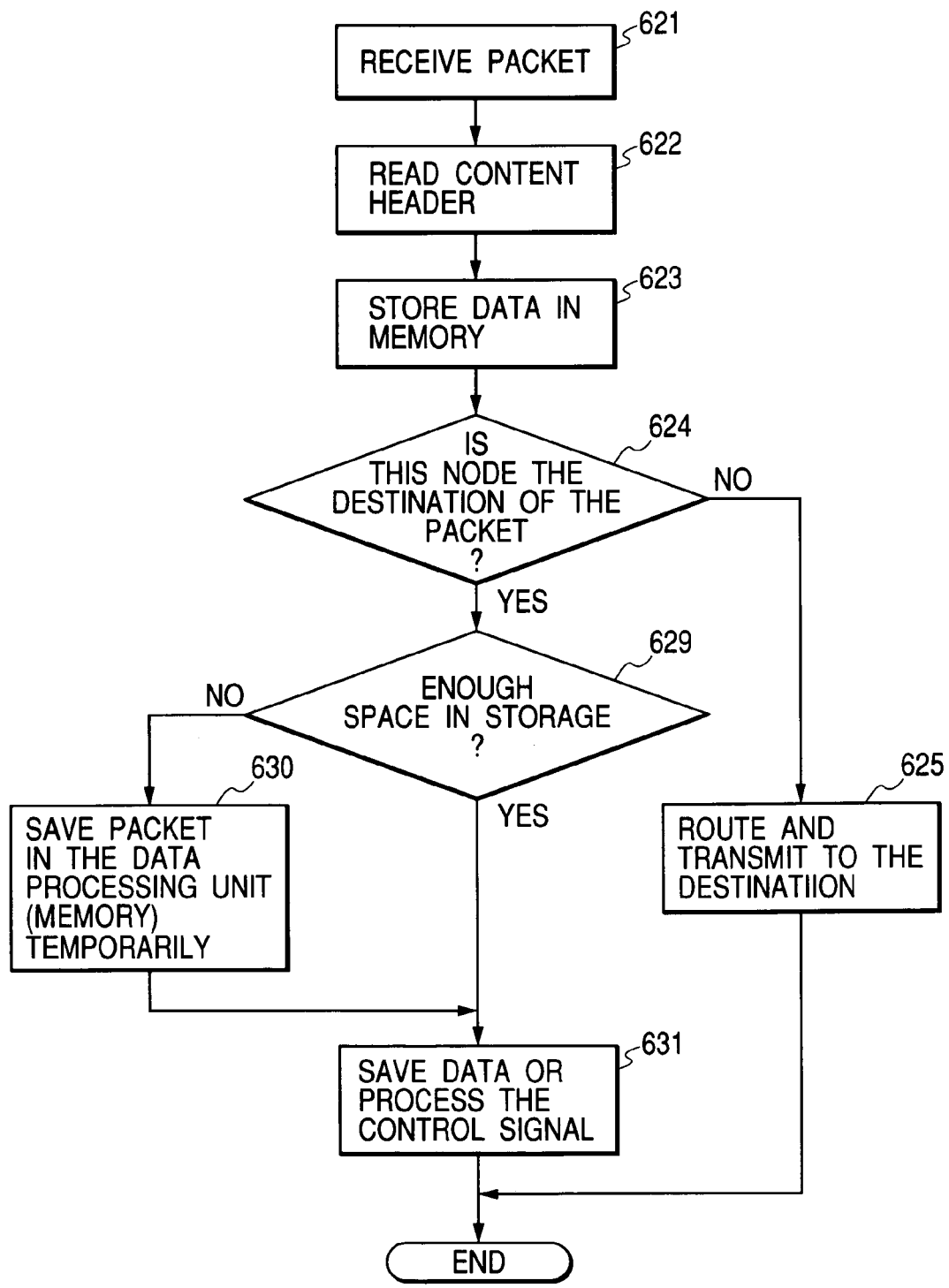
FIG. 16 is a flowchart of processes of routing and storing data into a storage which relates to the content-oriented routing according to the invention.

FIG. 16 shows a process of storing received data into a storage.

The process of storing data and routing shown in step 625 is as described in FIG. 15. Data is constructed by the data processing unit 30. In step 629, it is determined whether enough space is available in the storage 20 of the node or not. If it is determined that the available space is small, the data is temporarily held in the memory of the data processing unit 30 in step 630. It is considered that the data to be stored in the storage is different from the data to be temporarily stored in the memory in the case of FIG. 15. As soon as the enough memory area in the storage 20 becomes available, a process of storing data into the storage 20 and distributing data from the node is performed in step 631, and the routine is finished. If the received data packet is not addressed to the node itself, the data area on the memory can be released after performing the routing process in a manner similar to the case of FIG. 15.

Figure 17:
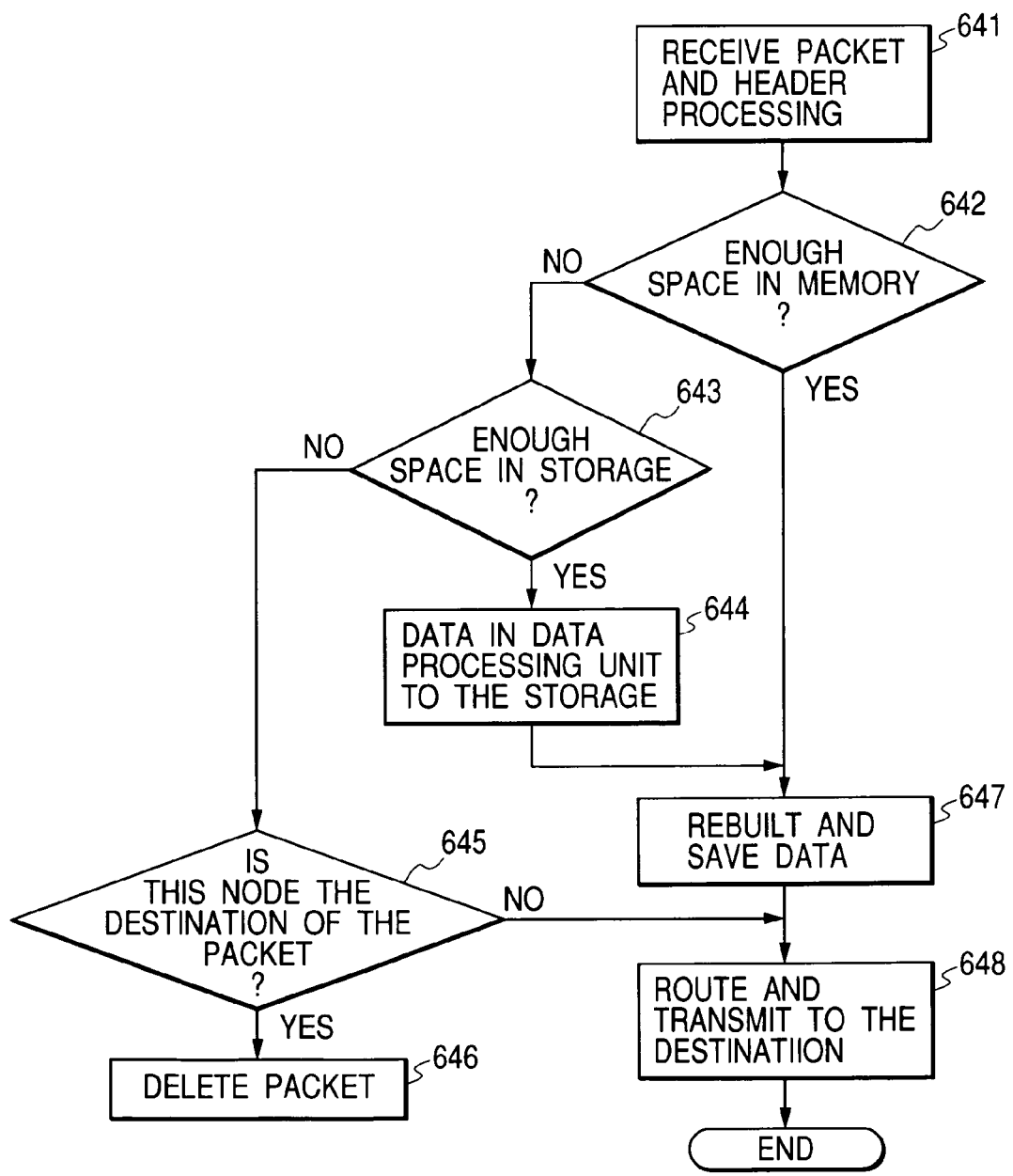
FIG. 17 is a flowchart showing a process of storing received data by a data processing unit in cooperation with a storage in the content-oriented routing according to the invention.

FIG. 17 shows processes for using the memory in the data processing unit 30 and the storage 20 in a linkage manner to store data.

In the case where there is no enough area for data reproduction in the memory space in step 642, whether there is enough space in the storage or not is checked in step 643. After that, the data stored on the memory is transferred to the storage 20 and data is rebuilt in the available space of the data processing unit 30. The data is rebuilt in step 647 and is either stored in the memory or storage or subjected to a process.

When the storage has no space sufficient to accept the data in the memory, whether the received packet is addressed to the node itself or not is determined in step 645. If YES, the packet is discarded and a re-transmission processing is requested. If NO, the routing processing is performed in step 648 without accompanying the storing process, thereby transmitting the received data to the next relay node. The process performed subsequent to the routing process in step 648 is as shown in FIG. 2.

By applying the content routing method of the invention, a route can be flexibly changed on the basis of information in the application layer.

Figure 18:
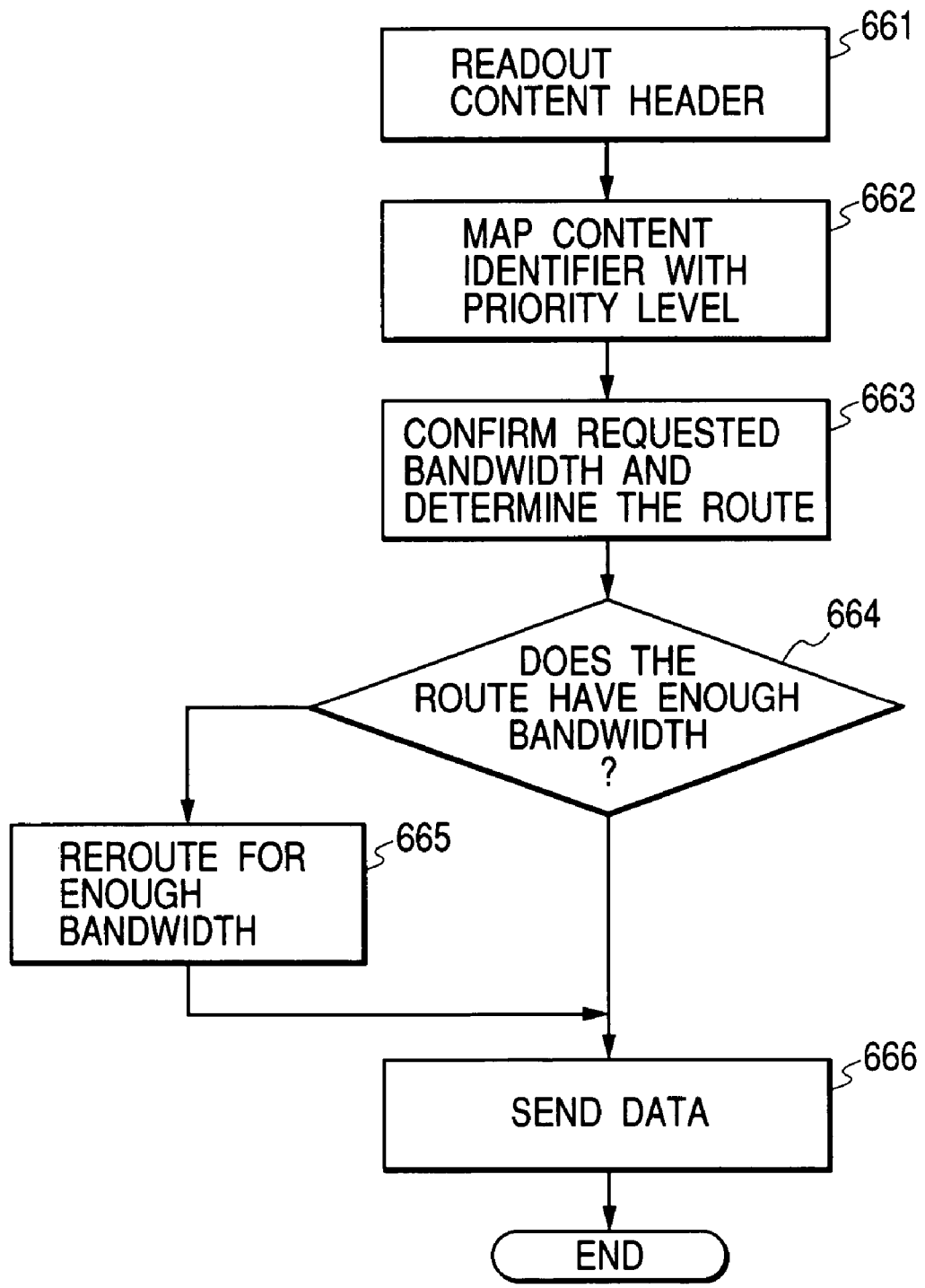
FIG. 18 is a flowchart showing a process of routing control wherein priority is given to each content in accordance with a feature of the invention.

FIG. 18 shows a flowchart of routing control performed in the case of data transfer of different priority levels, using a content identifier included in a content header as an embodiment of the invention.

By using the content identifier extracted from a data packet supplied to the input port in step 661, the priority level of the data packet is determined in step 662. In step 663, the packet is sent out to a proper route by a route selecting process based on the priority and a necessary bandwidth. In the case where it is judged in step 664 that the bandwidth assured is insufficient to transfer the data packet, another route is set in step 665 and the data packet is transferred via the route in step 666.

Figures 19, 20:
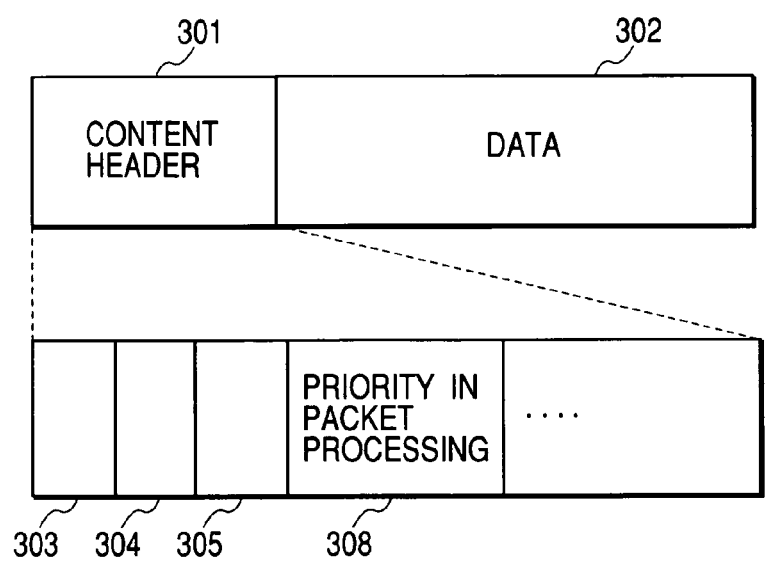
FIG. 19 is a diagram showing basic elements of a data header for use in the routing priority control in accordance with a feature of the invention.
FIG. 20 shows an example of the configuration of a storage routing table which is referred to by a relay node in the case of performing routing priority control in accordance with a feature of the invention.

FIG. 19 shows an example of the structure of the header of a data packet for realizing priority route control.

The content header 301 includes priority 308 in processing of the data, in addition to the destination NSA 303, source NSA 304 and data identifier 305. As a method of linking the route information table and a content identifier, for example, a content routing table including a content identifier may be prepared or a method of preparing a plurality of SRTs by priorities may be used.

FIG. 20 shows an example of the configuration of an SRT for data packet priority control.

Figure 21:
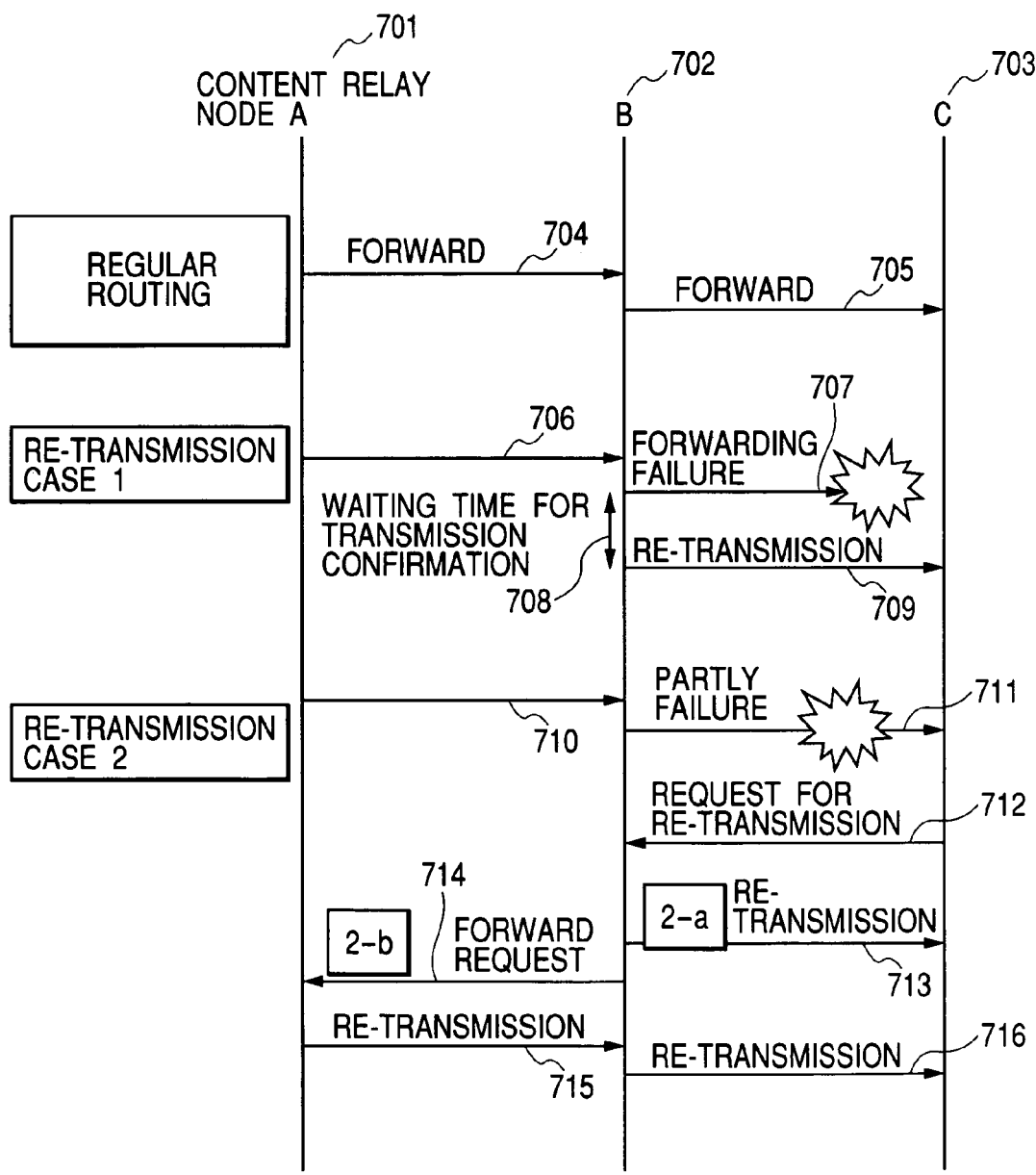
FIG. 21 is a diagram showing the flow of a data packet re-transmitting process between neighboring relay nodes in the content-oriented routing of the invention.

In the content routing method according to the invention, since each data is transferred while being stored in each relay node, it is unnecessary to request the source to re-transmit data at the time of a line failure. This hop-by-hop data re-transmission mechanism will be described with reference to FIG. 21.

It is now assumed that content relay nodes A 701, B 702 and C 703 in the invention are connected in this order. According to conventional content routing, data is transferred by transmission 704 and 705 to the next relay node while being stored in the storage in each relay node. Two cases will be described below as an example of occurrence of re-transmission.

In the case where data is completely lost in a certain area (Case 1), the relay node C 703 cannot know the existence of a data flow. The relay node B 702 waits for predetermined time to confirm if data transmission has succeeded or not. If there is no confirmation response, the relay node B 702 transmits the data again. At this time, the data relay route is re-set as necessary.

In the case where data is partly lost (Case 2) the relay node C 703, which is receiving the data, performs a process of reproducing data and confirming perfection of the data is performed. The relay node C 703 checks the content header information of the lost packet and sends a request for re-transmission 712 to the relay node B 702 at the preceding stage. If the requested data is held in the relay node B 702, the data is re-transmitted (713) immediately to the relay node C 703.

In the case where the requested data is not held in the relay node B 702, a re-transmission request 714 is forwarded to the relay node A 701 preceding to the relay node B 702 and necessary data is transmitted from the relay node A 701 to the relay node C 703 by re-transmission 715 and 716.

Figure 22:
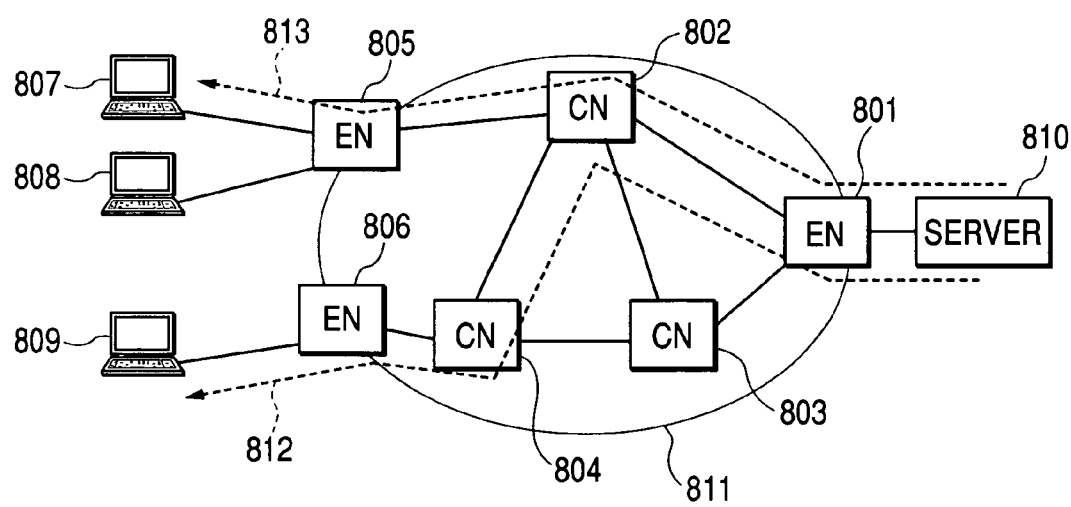
FIG. 22 is a network diagram for explaining effects of the data re-transmitting process between neighboring relay nodes in the content-oriented routing of the invention.

Effects in association with the case of using the hop-by-hop method will be described with reference to FIG. 22.

A data flow 813 distributed from a server 810 reaches a user terminal 807 via an edge node 801, a core relay node 802, and an edge, node 805. Simultaneously with this data flow distribution, it is assumed that data transmission 812 is performed from the server 810 to a terminal 809 via the edge relay node 801, core relay nodes 803 and 804, and the edge node 806. In the case where a part of data is lost due to a line failure between the edge node 806 and the core node 804, the edge node 806 sends a re-transmission request to the core node 804. The core node 804 transmits a necessary packet from among the data stored in itself.

Since a re-transmission request does not have to be forwarded to the server 810 unlike in the conventional network, the load of the data transfer processing on the server 810, edge node 801, and core node 802 is reduced and a process which does not exert an influence on transfer efficiency of the flow 813 can be realized.

Figure 24:
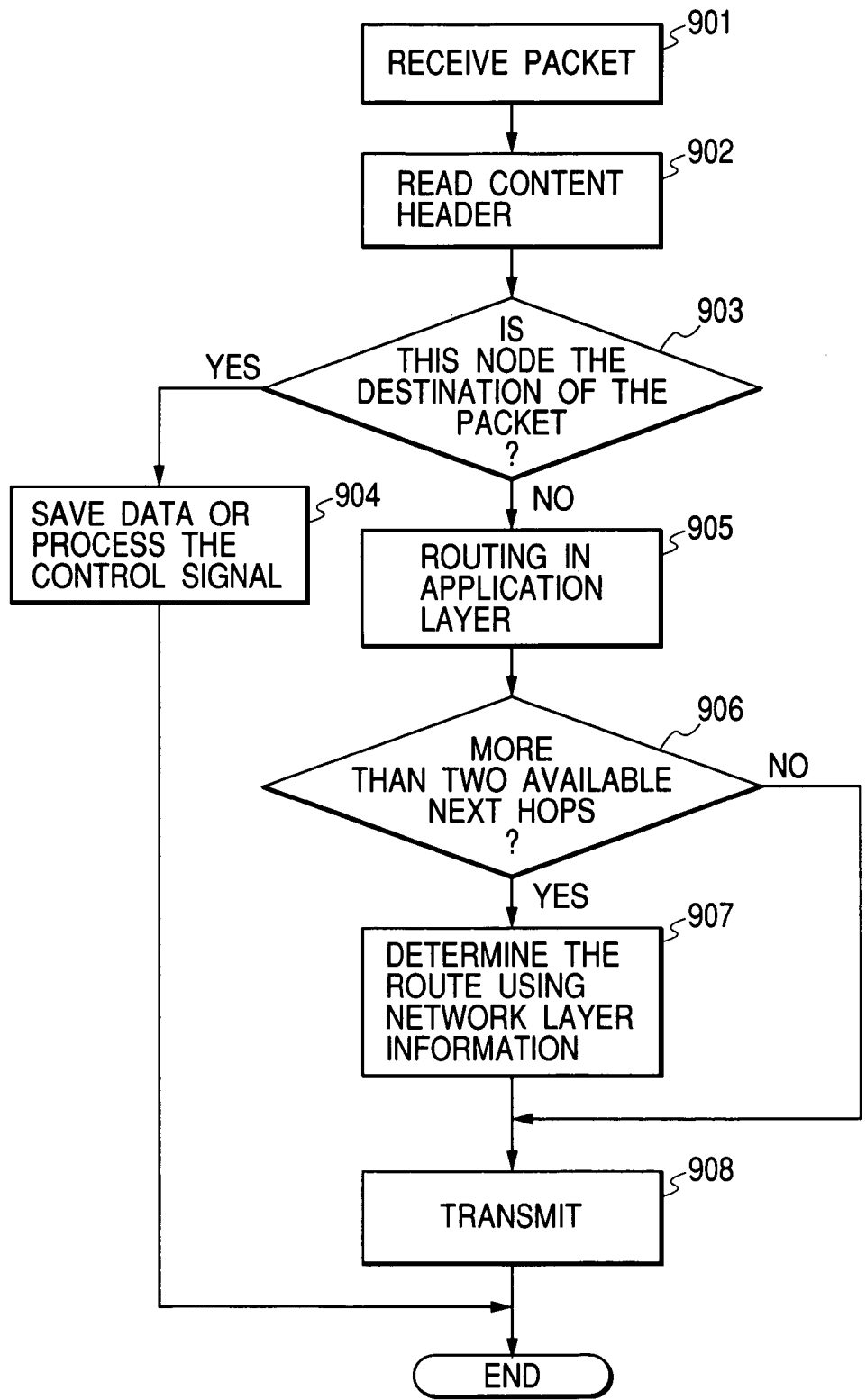
FIG. 24 is a flowchart of a content-oriented routing process using network layer routing information according to an embodiment of the invention.

Process for the case of using network layer information for route determination will now be described as an embodiment of the invention with reference to the flowchart of FIG. 24.

Figure 23:
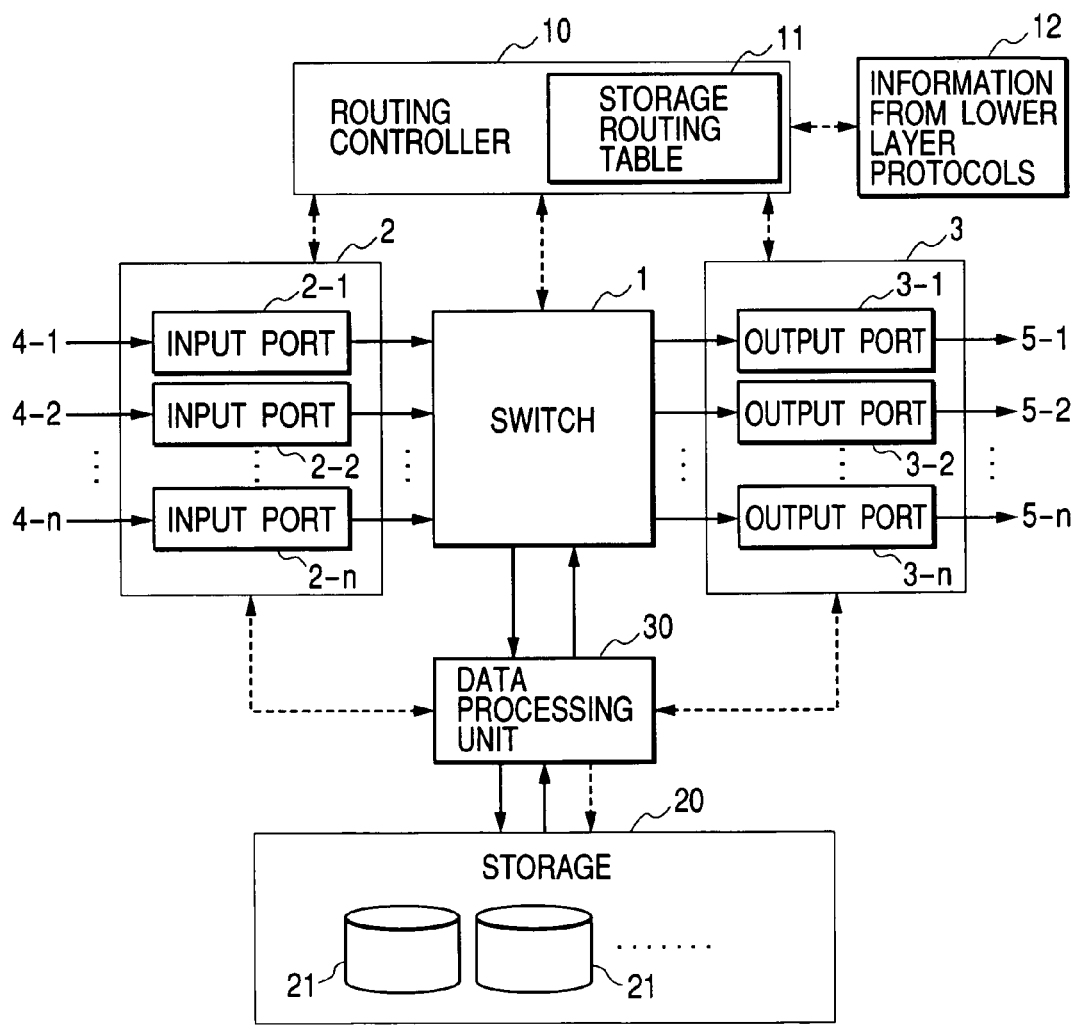
FIG. 23 is a block diagram showing a basic architecture for performing routing control in cooperation with a network layer routing protocol according to an embodiment of the invention.

FIG. 23 shows a basic configuration of an architecture for applying the method. Since a plurality of routes to the destination of a received data packet normally exist, when a plurality of possible routes are detected, a destination is determined by using any means. As an example of the means, a method of mechanically giving priority to an NSA may be adopted. However, by using information such as a failure, congestion state, and line cost of a network layer protocol at the time of selecting a route in content routing, more efficient routing can be achieved.

From a packet received by an input port of a relay node in step 901, the content header information is extracted by the receiving unit in step 902. When it is judged in step 903 that the packet is not addressed to the node, the destination is determined on the basis of destination information in step 905. When a plurality of next relay nodes to which the received packet can be sent exist (905) in step 907, the status information of lines to each of the next relay nodes or load on the processing in the node is obtained by using a protocol in a lower layer such as ICMP or SNMP and, on the basis of the information together with the SRT, the most effective route is determined. The information of the network layer may be included in the SRT or a table for holding the state of a network may be prepared separately from the SRT.

Figure 25:
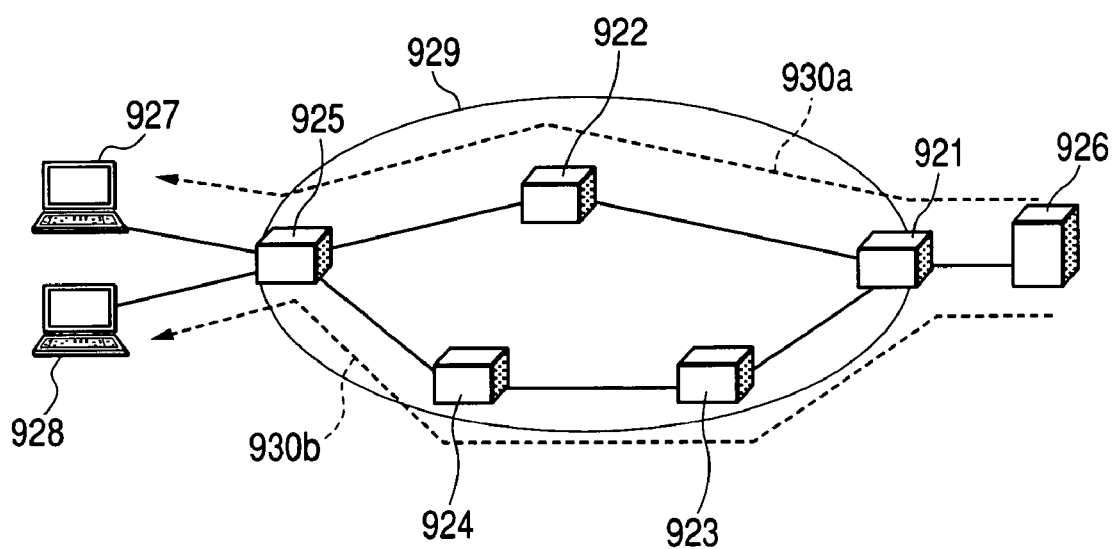
FIG. 25 is a diagram for explaining effects of the case of performing routing control in cooperation with a network layer in accordance with the invention.

Referring now to FIG. 25, the operation of the content relay node in cooperation with the network layer protocol will be described.

At the time of transferring data from a server 926 to the user, an edge relay node 921 generates the SRT by referring to the available capacities of the storages of the next relay nodes 922 and 923. The relay node 921 has a plurality of candidates of the destination.

In the case where memory space in one of the next nodes is insufficient, the relay node 921 transfers data to the other node which has sufficient space. In a state where both of the next nodes are available for the data transfer, a route 930a of which cost is lower is selected by using the protocol of the network layer. Further, when it is determined that, by referring to routing information in the network layer such as ICMP, for example, the bandwidth of the route 930a is insufficient due to other traffic, the SCR is switched to a route 930b.

All of routers in an existing network do not have to be replaced by the content relay node in the invention. The content relay node may be disposed, for example, every predetermined number of routers.

Figure 26:
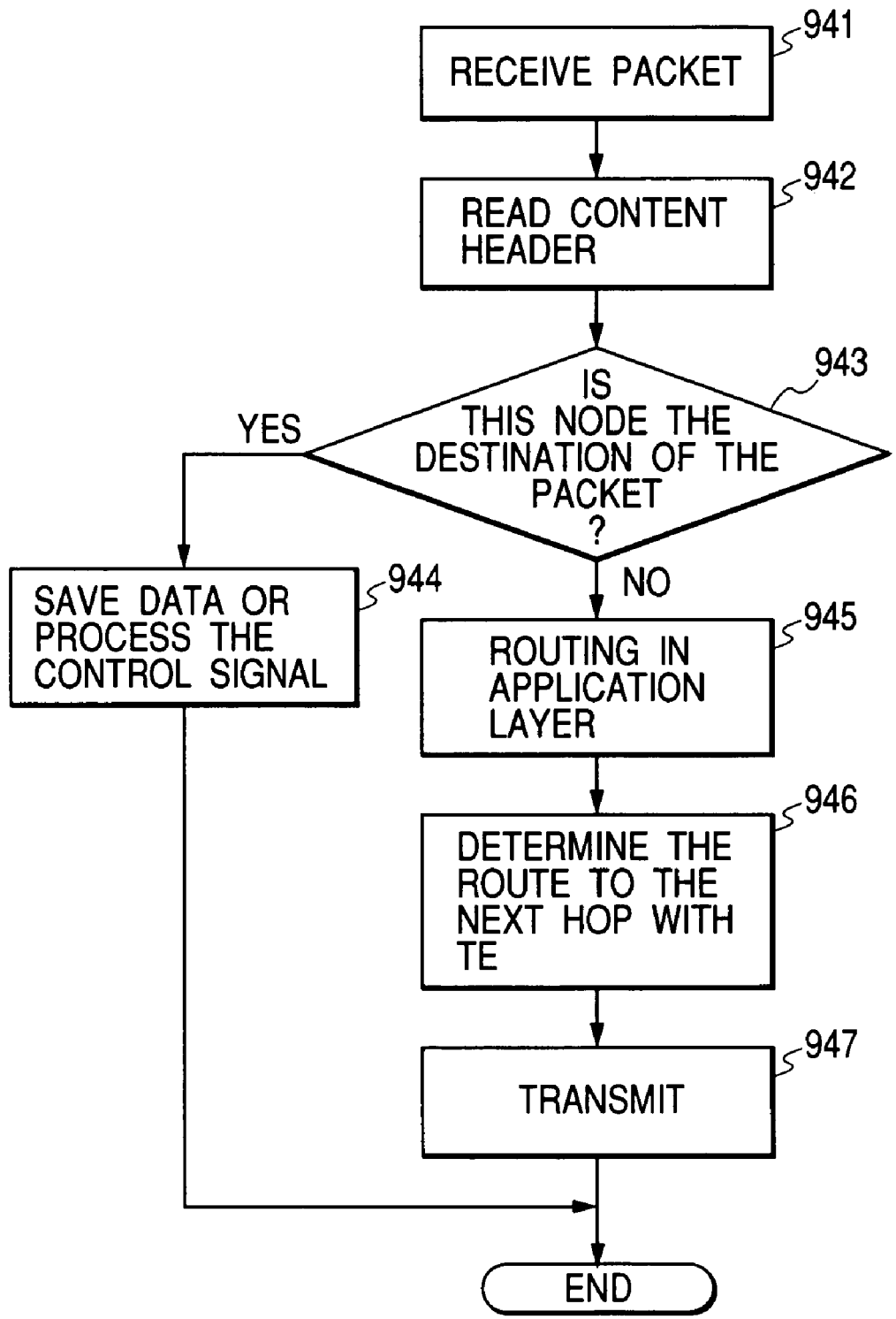
FIG. 26 is a flowchart showing the flow of process in which the content-oriented routing of the invention and traffic engineering are combined.

FIG. 26 is a flowchart for explaining a process of determining a route by using a traffic engineering (TE) function of MPLS.

In the embodiment, by the process according to FIG. 2, the header is extracted from a data packet and a destination NSA is determined with reference to the SRT in steps 941 to 945. If a plurality of destinations exist or a plurality of routes to the next relay node exist, transfer routes (label switched paths) are set on the possible routes between the relay nodes in step 946, and a route for data transfer is determined to assure the quality of transfer between nodes.

Figure 27:
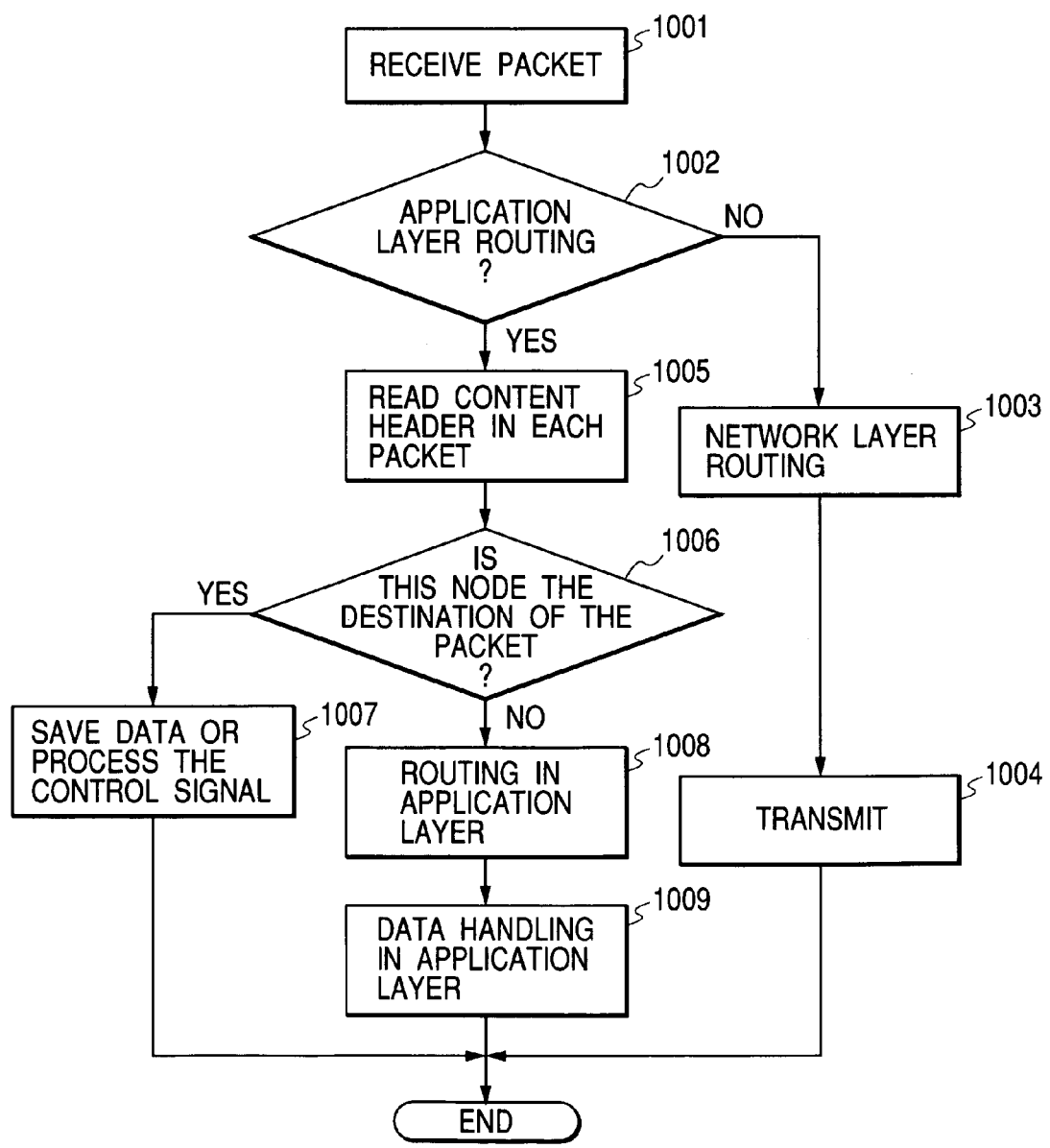
FIG. 27 is a flowchart showing the flow of process in the case of adding a content relay node of the invention to an existing network.

FIG. 27 shows a flow chart for explaining process in the content relay node at the time of introducing the content routing method of the invention to an IP network in the present state.

By introducing the content relay node according to the invention to an area where traffic is concentrated in a network layer, since the network layer protocol can exist together, it produces an advantage from the viewpoint of cost at the time of expanding a network. After receiving a data packet in step 1001, at the time of extracting header information in the receiving unit 2, whether the content routing method according to the invention is applicable to the data packet or not is determined in step 1002.

The determination in step 1002 of whether the content routing is performed or not is made on the basis of the presence/absence of an upper layer header, a network bandwidth use state, data attributes, and the like. In the case where the content routing is not performed, in step 1003, a data packet is transmitted through the content routing network according to a routing control using a protocol of the existing transport layer or lower. In step 1004, transmitting and re-transmitting processes are carried out according to the conventional transfer control protocol such as TCP or UDP. When it is determined in step 1002 that a data packet needs content routing, a series of processing of the content routing shown in FIG. 2 is performed in steps 1005 to 1009.

Figure 28:
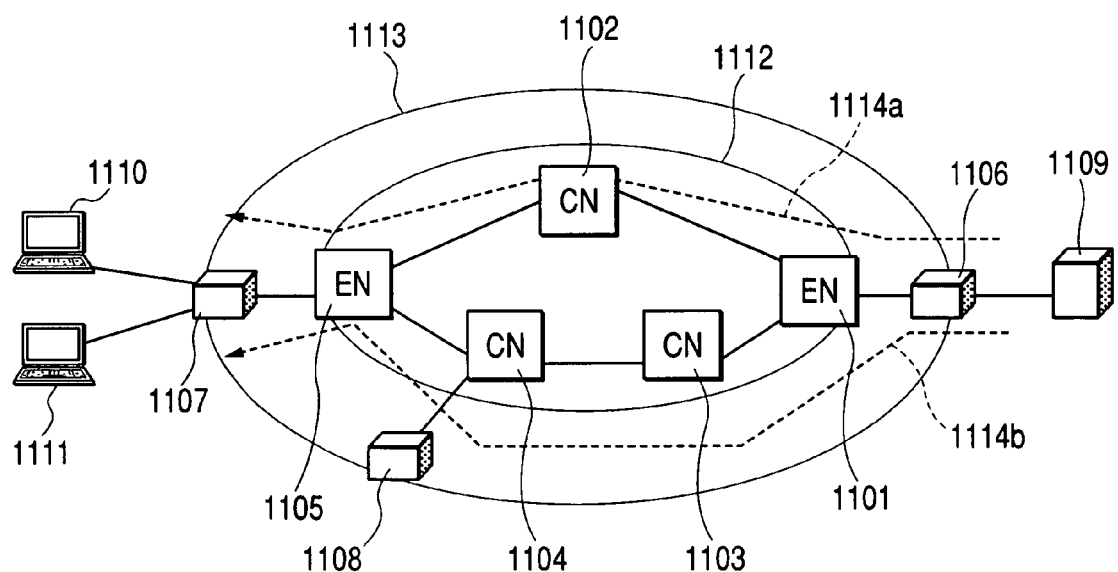
FIG. 28 is a diagram showing a network configuration in the case of adding the content relay node of the invention to an existing network.

FIG. 28 shows a conceptual diagram in the case of introducing the content routing method into an existing network.

Edge nodes (EN) 1101 and 1105 are edge nodes in a content routing network and core nodes (CN) are relay nodes placed in a core portion of the content routing network. Data transmitted from a server 1109 enters the network via an edge router 1106. The routing process described in FIG. 26 is carried out in each of relay nodes in the content routing network. The edge node 1101 checks the upper layer header, bandwidth information, data attributes, and the like. When it is judged that the content routing method is necessary, the upper layer header processing is performed and routing according to FIG. 2 is carried out. The upper layer header may be added by the server 1109 or by the edge node 1101.

At the time of data transfer from the content routing network to the existing network, a necessary upper layer header processing is performed by the edge node 1105. Specifically, in the case where content routing is conducted between a server and a terminal device or between the content routing node 1105 and a terminal device, the upper layer header is held. In the case of using the upper layer header only in the content routing network, the upper layer header is deleted by the edge node 1105.

According to the embodiments of the invention described above, in a data transfer on a network, at the time of transferring a large amount of data such as moving image data, sound data, and business data, a data transfer using a memory area in a storage is performed, thereby enabling content relay node to select a proper route according to traffic in the network and to avoid insufficient bandwidth caused by limitation of a route in the conventional routing and congestion accompanying the insufficient bandwidth. By introducing an NSA and conducting routing based on available space in a storage, a route can be set by the method independent of network layer routing, so that a bandwidth can be assured differently from the conventional manner. Consequently, coexistence with the existing protocols is possible, and more flexible network designing can be achieved by utilizing the characteristics of the protocols.

By conducting routing utilizing data attributes of an application layer, a finer network configuration as compared with the case of using a network interface of a conventional router can be constructed. Further, since a plurality of NSAs distinctive logically can be provided in a content relay node, the flexibility of assigning addresses is increased as compared with the case of using a network layer. Thus, effects such that the invention can be applied to priority control in data transfer and the efficiency of address management is increased are expected.

In the invention, by providing each content relay node with the data storing function to perform routing and storing of data at the same time, data can be distributed with reliability even in the case where heavy traffic occurs. Further, since a data flow is checked between relay nodes, even in the case where a network failure occurs during transfer of a large amount of data and forwarding failure occurs in part or all of data packets, necessary data can be re-transmitted from the nearest node, so that it is able to remarkably reduce the waste of network resources due to a number of re-transmission requests expected to be frequently issued when a large amount of content flows on the conventional network.

A content relay node according to the invention is easy to be introduced into an existing network. It is unnecessary to replace all of nodes in a network, and by introducing a content relay node of the invention to an area where traffic is heavy, the bandwidth can be effectively used and effects from the viewpoint of cost can be also expected. The invention realizes effective use of bandwidth which is difficult to be accomplished by conventional network technology.

The invention provides not only the configurations described in the scope of claims but also the following content-oriented routing method.

(1) A content-oriented routing method of routing a data packet on the basis of a data attribute in an application layer in a content relay node including: a receiving unit having a plurality of input ports; a transmitting unit having a plurality of output ports; a data processing unit; a switch unit for connecting the receiving unit, the transmitting unit, and the data processing unit; a plurality of storage shaving a data storing function; and a routing control unit for controlling the receiving unit, the transmitting unit, the switch unit, and the storages, each of the data packets including a storage address for identifying the plurality of storages on a network and a data attribute, wherein the receiving unit executes a step of receiving a data packet, a step of extracting the storage address and the data attribute from the data packet, a step of transferring the data attribute to the routing control unit, and a step of sending the data packet to the switch unit, the routing control unit executes the step of selecting the transmitting unit or the data processing unit as a destination of a received data packet on the basis of routing information including the storage address and instructing the switch unit to make switching, the storage executes the step of storing the received data, the switch unit executes the step of switching a route on the basis of the control signal, the data processing unit executes the step of storing or transmitting data on the basis of the data attribute, and the transmitting unit executes the step of processing the header of a data packet in accordance with a control signal from the control unit and the step of transferring a data packet to a neighboring relay node.

(2) In the content-oriented routing method, a storage routing table (SRT) expressed by using identification information (network storage address: NSA) for identifying a storage on a network is held in the control unit and a destination NSA corresponding to the destination NSA is determined by using the SRT.

(3) In the content-oriented routing method, the NSA is expressed by one piece of or a combination of a plurality of pieces of information indicative of position of a relay node on a network, identification information of a storage distinctive physically or logically, and information for specifying a data storage location by designating a directory or a block address in a storage area.

(4) In the content-oriented routing method, the receiving unit processes the header of the input packet and sends, in order to store received data into a memory in the control unit or into the storage, a copy of the input data to the control unit, and the control unit identifies the data packet on the basis of the header information and stores the received data in the node until transfer of the data at least to the next relay node is completed.

(5) The content-oriented routing method includes, in the data storing process, at least one of the step of storing received data in the form of a packet and the step of rebuilding data from a plurality of packets and storing the rebuilt data in the node.

(6) In the content-oriented routing method, in the case where the receiving unit detects a data transmission request, data stored in the node is read out and re-transmitted.

(7) In the content-oriented routing method, when the content relay node determines correspondence, to be registered in the SRT, between a destination NSA and the next NSA for relay, a route is judged on the basis of data size of a received data flow and available memory space in the next storage for relay, thereby to construct an SRT.

(8) In the content-oriented routing method, relay nodes constructing a network for content routing notify each other of available memory spaces of themselves.

(9) In the content-oriented routing method, the receiving unit determines whether data supplied to an input port is to be routed on the basis of a storage address or not.

(10) In the content-oriented routing method, route information obtained by function of a transfer protocol of a lower layer is used at the time of determining a transfer route.

(11) The content-oriented routing method further includes the step of dividing data into a plurality of packets in an application layer as necessary and transmitting the packets.

(12) In the content-oriented routing method, the data packet is comprised of a header including a data attribute of the application layer and data.

(13) In the content-oriented routing method, the header of the data packet includes a destination NSA of data and a source NSA of the data.

(14) In the content-oriented routing method, each of the data packets includes data identifiers indicating that the data packets are generated from the same data as a data attribute included in the header, and packet identifiers indicative of the order of the data packets as re-building information in the case where the data is transmitted in a divided form.

(15) In the content-oriented routing method, the data packet includes priority information of the data packet in its header in order to preferentially determine the route according to the data attribute.

What is claimed is:

1. A content relay node having a function of routing data packets in an application layer of the International Organization for Standardization/Open Systems Interconnection (ISO/OSI) reference model, comprising:
    a receiving unit having a plurality of input ports;
    a transmitting unit having a plurality of output ports;
    a data processing unit;
    a switch unit for connecting said receiving unit, said transmitting unit, and said data processing unit;
    a plurality of storages being coupled to said data processing unit and having a data storing function;
    a routing control unit for controlling said transmitting and switch units, and
    wherein each of said data packets includes a storage address of the application layer for identifying said plurality of storages on a network and a data attribute,
    wherein said receiving unit has means for receiving a data packet, means for extracting the storage address of the application layer and the data attribute from the data packet, means for transferring the data attribute to said data processing unit and the storage address of the application layer said routing control unit, and means for sending the data packet to said switch unit,
    wherein said routing control unit has means for selecting, as a destination of a received data packet, one of the said transmitting unit and said data processing unit based on the SRT and routing information of the received packet which includes the storage address of the application layer and instructing said switch unit to make switching,
    wherein said storage has means for storing the received data,
    wherein said switch unit has means for switching a route according to an instruction from said routing control unit,
    wherein said data processing unit has means for storing or transmitting data based on data attribute, and
    wherein said transmitting unit has means for processing the header of a data packet in accordance with a control signal from said routing control unit and means for transferring the data packet to a neighboring relay node; and
    means for determining a route and constructing a storage routing table (SRT) based on data size of a received data flow and available memory space in the next storage for relay at the time of determining correspondence, to be registered in the SRT, between a destination network storage address (NSA) and the next NSA for relay.

2. The content relay node according to claim 1, wherein said routing control unit further comprises:
    a storage routing table (SRT) expressed by using said network storage address (NSA) for identifying a storage on a network; and
    means for determining one of said output ports corresponding to the designated NSA by using said SRT.

3. The content relay node according to claim 2, wherein said NSA is expressed by one piece of or a combination of a plurality of pieces of information indicative of position of a relay node on a network, identification information of a storage distinctive physically or logically, and information for specifying a data storage location by designating a directory or a block address in a storage area.

4. The content relay node according to claim 1, wherein the storage has a memory or a memory space constructed by one Hard Disk Drive (HDD) or a plurality of media.

5. The content relay node according to claim 1, wherein said switch unit has means for sending an input data packet to the data processing unit in order to store received data into the storage, and
    wherein said storage has means for receiving data from said data processing unit and storing the received data in the node at least until transfer of the data to the next relay node is completed.

6. The content relay node according to claim 5, further comprising:
   at least one of means for storing received data in the form of a packet and means for rebuilding data from a plurality of packets and storing the rebuilt data in the node, in said data storing process.

7. The content relay node according to claim 1, further comprising:
   means for reading out data stored in the node and re-transmitting the data in the case where the receiving unit detects a data transmission request.

8. The content relay node according to claim 1, further comprising:
   means for notifying the other nodes constructing a content routing network of available memory spaces to each other.

9. The content relay node according to claim 1, wherein said receiving unit has means for determining whether data supplied to an input port is to be routed based on a storage address or not.

10. The content relay node according to claim 1, further comprising:
    means for using route information obtained by function of a transfer protocol of a lower layer at the time of determining a transfer route.

11. The content relay node according to claim 1, further comprising:
    means for dividing data into a plurality of packets in an application layer as necessary and transmitting the packets.

12. The content relay node according to claim 1, wherein said data packet is comprised of a header portion including a data attribute of the application layer and data portion including the contents of data.

13. The content relay node according to claim 1, wherein said data packet includes in a header portion thereof a destination network storage address (NSA) and a source NSA of the data packet.

14. The content relay node according to claim 1, wherein said data packets include, as a data attribute included in the header, data identifiers indicating that the data packets are generated from the same data, and packet identifiers indicative of the order of the data packets as re-building information in the case where the data is divided and the resultant is transmitted.

15. The content relay node according to claim 1, wherein said data packet includes priority information of the data packet in its header in order to preferentially determine the route according to a data attribute.

\* \* \* \* \*